United States Patent
Zhao et al.

(10) Patent No.: US 10,470,225 B2
(45) Date of Patent: Nov. 5, 2019

(54) SYSTEM AND METHOD FOR ENHANCE THE USER EXPERIENCE OF APPLICATIONS FOR PROXIMITY-BASED PEER-TO-PEER MOBILE COMPUTING

(71) Applicants: QUALCOMM Incorporated, San Diego, CA (US); Haijun Zhao, Beijing (CN); Brian Spencer, San Diego, CA (US)

(72) Inventors: Haijun Zhao, Beijing (CN); Brian Spencer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/119,602

(22) PCT Filed: Mar. 26, 2014

(86) PCT No.: PCT/CN2014/074135
§ 371 (c)(1),
(2) Date: Aug. 17, 2016

(87) PCT Pub. No.: WO2015/143647
PCT Pub. Date: Oct. 1, 2015

(65) Prior Publication Data
US 2017/0064753 A1    Mar. 2, 2017

(51) Int. Cl.
*H04W 76/14*    (2018.01)
*H04W 4/80*    (2018.01)
(Continued)

(52) U.S. Cl.
CPC .......... *H04W 76/14* (2018.02); *H04B 5/0031* (2013.01); *H04B 5/0062* (2013.01);
(Continued)

(58) Field of Classification Search
CPC ... H04B 5/0031; H04B 5/0062; H04W 4/008; H04W 76/023; H04W 8/005; H04W 8/183; H04W 8/24
(Continued)

(56) References Cited

U.S. PATENT DOCUMENTS 7,970,350 B2   6/2011   Sheynman et al.
8,375,019 B2   2/2013   Salinas
(Continued)

FOREIGN PATENT DOCUMENTS

CN   101843124 A   9/2010
CN   103428808 A   12/2013
(Continued)

OTHER PUBLICATIONS

International Search Report and Written Opinion—PCT/CN2014/074135—ISA/EPO—dated Jan. 5, 2015.
(Continued)

*Primary Examiner* — Eugene Yun
(74) *Attorney, Agent, or Firm* — Muncy, Geissler, Olds & Lowe, P.C.

(57) ABSTRACT

The disclosure is related to searching for a second device to provide a service that a first device is attempting to establish. The first device sends a search profile and a capabilities profile to the second device using near field communication (NFC), the search profile including criteria describing the service the first device is attempting to establish, the capabilities profile including connection capabilities of the first device, receives a score from the second device, the score indicating a closeness of a match between the search profile and the capabilities profile and one or more services and capabilities of the second device, and determines whether to connect with the second device to establish the service based on the received score.

28 Claims, 16 Drawing Sheets

(51) Int. Cl.
*H04B 5/00* (2006.01)
*H04W 8/18* (2009.01)
*H04W 8/24* (2009.01)
*H04W 8/00* (2009.01)

(52) U.S. Cl.
CPC ............. *H04W 4/80* (2018.02); *H04W 8/183* (2013.01); *H04W 8/24* (2013.01); *H04W 8/005* (2013.01)

(58) Field of Classification Search
USPC ........................................................ 455/41.1
See application file for complete search history.

(56) References Cited

U.S. PATENT DOCUMENTS

| | | | |
|---|---|---|---|
| 2005/0132264 A1 | 6/2005 | Joshi et al. | |
| 2006/0179079 A1 | 8/2006 | Kolehmainen | |
| 2007/0226365 A1 | 9/2007 | Hildreth et al. | |
| 2009/0111378 A1* | 4/2009 | Sheynman | H04W 8/005 455/41.1 |
| 2010/0087194 A1* | 4/2010 | MacNaughtan | H04W 64/00 455/435.2 |
| 2012/0322368 A1 | 12/2012 | Desai et al. | |
| 2013/0309971 A1 | 11/2013 | Kiukkonen et al. | |
| 2014/0136630 A1* | 5/2014 | Siegel | G06Q 10/1095 709/206 |

FOREIGN PATENT DOCUMENTS

| | | |
|---|---|---|
| EP | 2166732 A1 | 3/2010 |
| EP | 2625876 A1 | 8/2013 |
| JP | 2004258747 A | 9/2004 |
| JP | 2010073105 A | 4/2010 |
| WO | 2008105922 A2 | 9/2008 |
| WO | 2009058494 A1 | 5/2009 |
| WO | 2013087088 A1 | 6/2013 |

OTHER PUBLICATIONS

Supplementary European Search Report—EP14887306—Search Authority—Munich—dated Oct. 25, 2017.
Ververidis C.N, et al., "Service Discovery for Mobile Ad Hoc Networks, A Survey of Issues and Techniques", IEEE Communications Surveys, IEEE, New York, NY, US, vol. 10, No. 3, Jul. 1, 2008 (Jul. 1, 2008), XP011234560, pp. 30-45, ISSN, 1553-877X, DOI, DOI,10.1109/COMST.2008.4625803 p. 34, left-hand column, paragraph 4-p. 36, left-hand column, paragraph 2.

* cited by examiner

SYSTEM AND METHOD FOR ENHANCE THE USER EXPERIENCE OF APPLICATIONS FOR PROXIMITY-BASED PEER-TO-PEER MOBILE COMPUTING

CROSS-REFERENCE TO RELATED APPLICATIONS

This application is the U.S. National Stage Entry under 35 U.S.C. § 371 of International Application No. PCT/CN2014/074135, filed on Mar. 26, 2014, which is incorporated herein in its entirety.

BACKGROUND

1. Field of the Disclosure

The disclosure is related to systems and methods to enhance the user experience of applications for proximity-based peer-to-peer mobile computing.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

In general, user equipments (UEs), such as telephones, tablet computers, laptop and desktop computers, certain vehicles, etc., can be configured to connect with each other either locally (e.g., Bluetooth, local Wi-Fi, etc.) or remotely (e.g., via cellular networks, through the Internet, etc.). Furthermore, certain UEs may also support proximity-based peer-to-peer (P2P) communication using certain wireless networking technologies (e.g., Wi-Fi, Bluetooth, Wi-Fi Direct, etc.) that enable devices to make a one-to-one connection or simultaneously connect to a group that includes several devices in order to directly communicate with one another.

A P2P network is a type of decentralized and distributed network architecture in which individual nodes in the network (called "peers") act as both suppliers and consumers of resources. In contrast, in the centralized client-server model, client nodes request access to resources provided by central servers. In a P2P network, tasks (such as searching for files or streaming audio/video) are shared among multiple interconnected peer devices that each make a portion of their resources (such as processing power, disk storage, network bandwidth, etc.) directly available to other network participants, without the need for centralized coordination by a server.

The P2P software running on each peer device typically provides service advertisement and discovery, session setup, session management (e.g., join/leave), and data transfer. A problem with current P2P software is that there is no perfect solution to setup the appropriate wireless network connectivity for a peer device. Current P2P software solutions assume that either the user manually sets up network connectivity (e.g., WiFi, WiFi Direct, LTE-Direct, Bluetooth, etc.) among peer devices before startup, or the application hard-code sets up network connectivity among the peer devices before startup. However, the former requires the manual intervention of the user, and the latter introduces additional complexity and is more prone to error.

Another problem with current P2P software is that a peer device may have difficulty finding an appropriate supplier peer device. During the advertisement/discovery period, supplier peer devices usually advertise "well-known service name" as a string, and consumer peer devices discover the supplier peer device using the prefix of this well-known name. However, with more and more peer devices having P2P service capability, this simple advertisement/discovery mechanism makes it difficult for consumer peer devices to find appropriate supplier peer devices.

SUMMARY

The disclosure is related to searching for a second device to provide a service that a first device is attempting to establish. A method of searching for a second device to provide a service that a first device is attempting to establish includes sending a search profile and a capabilities profile from the first device to the second device using near field communication (NFC), the search profile including criteria describing a service the first device is attempting to establish, the capabilities profile including connection capabilities of the first device, receiving a score from the second device, the score indicating a closeness of a match between the search profile and the capabilities profile and one or more services and capabilities of the second device, and determining whether to connect with the second device to establish the service based on the received score.

An apparatus for searching for a second device to provide a service that a first device is attempting to establish includes logic configured to send a search profile and a capabilities profile from the first device to the second device using NFC, the search profile including criteria describing the service the first device is attempting to establish, the capabilities profile including connection capabilities of the first device, logic configured to receive a score from the second device, the score indicating a closeness of a match between the search profile and the capabilities profile and one or more services and capabilities of the second device, and logic configured to determine whether to connect with the second device to establish the service based on the received score.

An apparatus for searching for a second device to provide a service that a first device is attempting to establish includes means for sending a search profile and a capabilities profile from the first device to the second device using NFC, the search profile including criteria describing the service the first device is attempting to establish, the capabilities profile including connection capabilities of the first device, means for receiving a score from the second device, the score indicating a closeness of a match between the search profile and the capabilities profile and one or more services and capabilities of the second device, and means for determining whether to connect with the second device to establish the service based on the received score.

A non-transitory computer-readable medium for searching for a second device to provide a service that a first device is attempting to establish includes at least one instruction to send a search profile and a capabilities profile from the first device to the second device using NFC, the search profile including criteria describing the service the first device is attempting to establish, the capabilities profile including connection capabilities of the first device, at least one instruction to receive a score from the second device, the score indicating a closeness of a match between the search profile and the capabilities profile and one or more services and capabilities of the second device, and at least one instruction to determine whether to connect with the second device to establish the service based on the received score.

The disclosure is related to providing a score for a service that a second device is attempting to establish. A method of providing a score for a service that a second device is attempting to establish includes receiving, by a first device, a search profile and a capabilities profile from the second device using NFC, the search profile including criteria describing the service the first device is attempting to establish, the capabilities profile including connection capabilities of the first device, calculating a score indicating a closeness of a match between the search profile and the capabilities profile and one or more services and capabilities of the second device, and sending the score to the second device using NFC.

An apparatus for providing a score for a service that a second device is attempting to establish includes logic configured to receive, by a first device, a search profile and a capabilities profile from the second device using NFC, the search profile including criteria describing the service the first device is attempting to establish, the capabilities profile including connection capabilities of the first device, logic configured to calculate a score indicating a closeness of a match between the search profile and the capabilities profile and one or more services and capabilities of the second device, and logic configured to send the score to the second device using NFC.

An apparatus of providing a score for a service that a second device is attempting to establish includes means for receiving, by a first device, a search profile and a capabilities profile from the second device using NFC, the search profile including criteria describing the service the first device is attempting to establish, the capabilities profile including connection capabilities of the first device, means for calculating a score indicating a closeness of a match between the search profile and the capabilities profile and one or more services and capabilities of the second device, and means for sending the score to the second device using NFC.

A non-transitory computer-readable medium for providing a score for a service that a second device is attempting to establish includes at least one instruction to receive, by a first device, a search profile and a capabilities profile from the second device using NFC, the search profile including criteria describing the service the first device is attempting to establish, the capabilities profile including connection capabilities of the first device, at least one instruction to calculate a score indicating a closeness of a match between the search profile and the capabilities profile and one or more services and capabilities of the second device, and at least one instruction to send the score to the second device using NFC.

BRIEF DESCRIPTION OF THE DRAWINGS

A more complete appreciation of embodiments of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
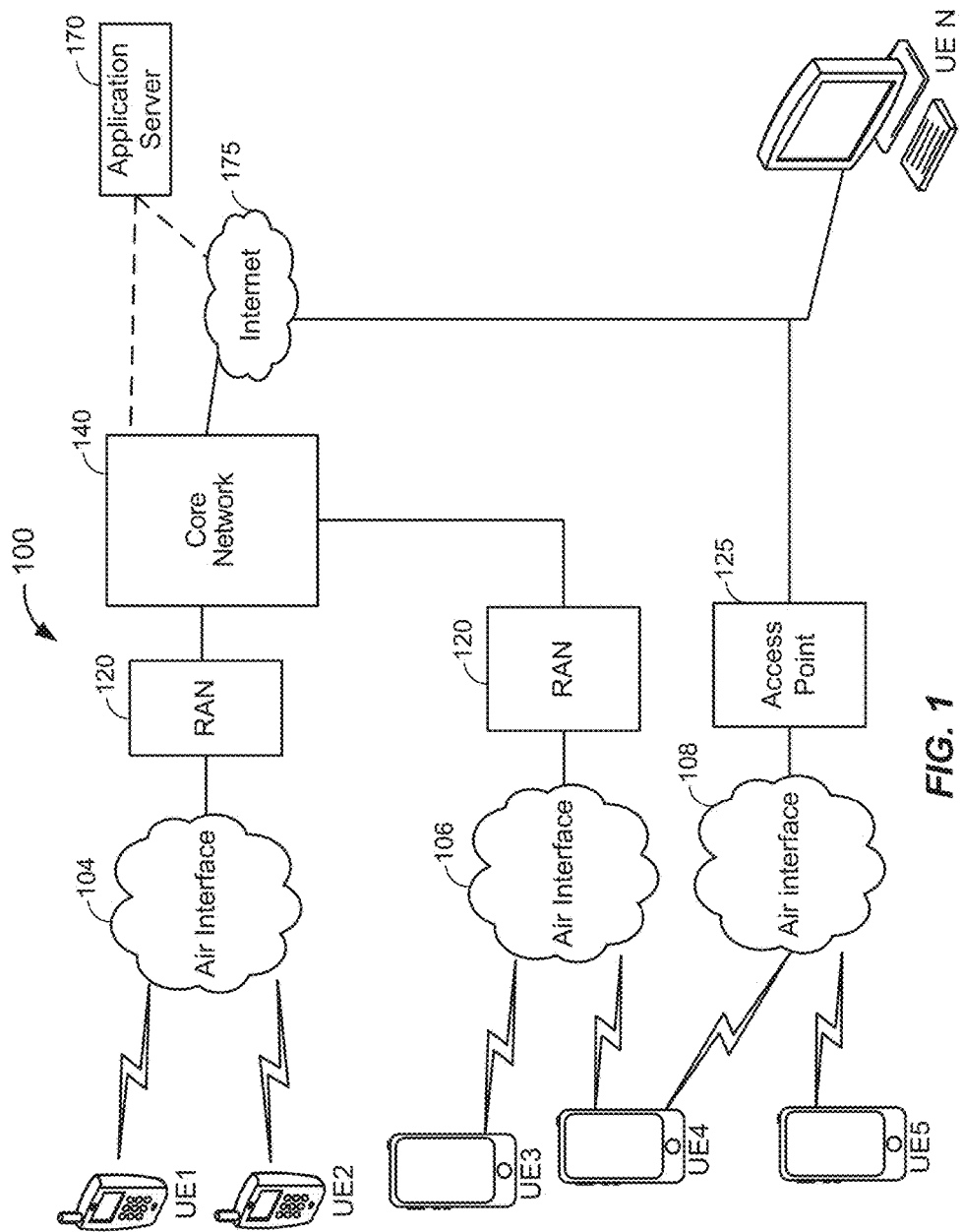
FIG. 1 illustrates a high-level system architecture of a wireless communications system in accordance with an embodiment of the disclosure.

Aspects of the disclosure are disclosed in the following description and related drawings. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
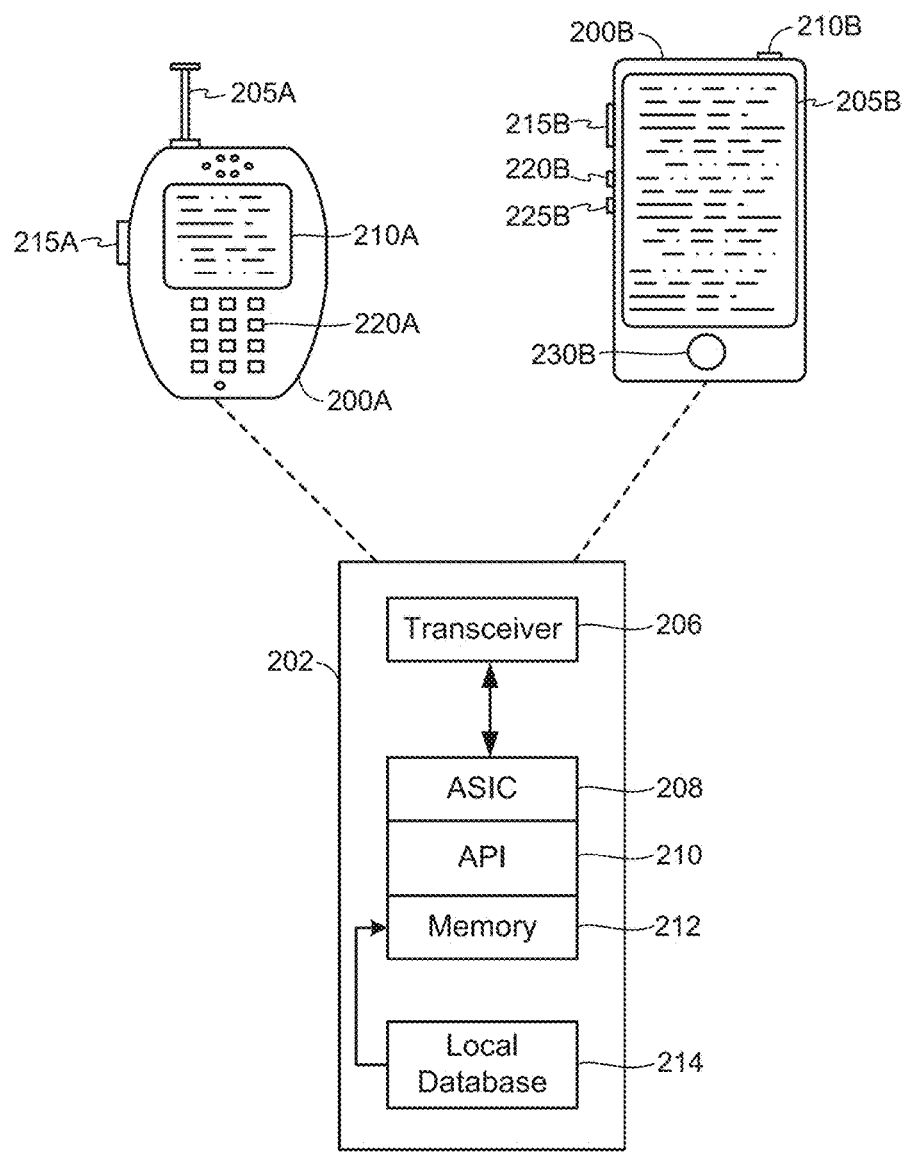
FIG. 2 illustrates examples of user equipments (UEs) in accordance with embodiments of the disclosure.

FIG. 2 illustrates examples of UEs (i.e., client devices) in accordance with embodiments of the disclosure. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an embodiment of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the disclosure is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the disclosure and are merely to aid in the description of aspects of embodiments of the disclosure.

Figure 3:
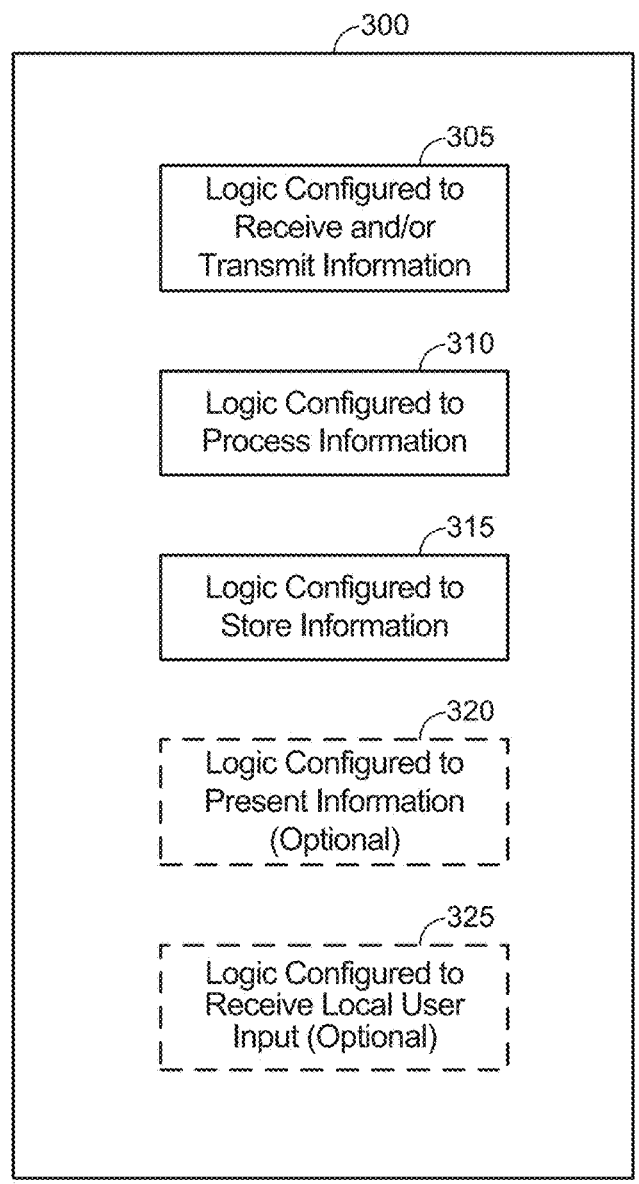
FIG. 3 illustrates a communication device that includes logic configured to perform functionality in accordance with an embodiment of the disclosure.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, AP 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, near field communication (NFC), radio-frequency identification (RFID), etc.), such as a wireless transceiver and associated hardware (e.g., an RF antenna, a MODEM, a modulator and/or demodulator, an NFC reader, an RFID reader, an NFC tag, an RFID tag, etc.). As an example, the logic configured to receive and/or transmit information 305 may correspond to logic configured to send a search profile and a capabilities profile from a first device to a second device using NFC, the search profile including criteria describing the service the first device is attempting to establish, the capabilities profile including connection capabilities of the first device, and logic configured to receive a score from the second device, the score indicating a closeness of a match between the search profile and the capabilities profile and one or more services and capabilities of the second device. As another example, the logic configured to receive and/or transmit information 305 may correspond to logic configured to receive, by a first device, a search profile and a capabilities profile from the second device using NFC, the search profile including criteria describing the service the first device is attempting to establish, the capabilities profile including connection capabilities of the first device, and logic configured to send a score indicating a closeness of a match between the search profile and the capabilities profile and one or more services and capabilities of the second device to the second device using NFC. In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the logic configured to process information 310 may correspond to logic configured to determine whether to connect with a second device to establish a service a first device is attempting to establish based on a received score indicating a closeness of a match between a search profile and a capabilities profile and one or more services and capabilities of the second device. As another example, the logic configured to process information 310 may correspond to logic configured to calculate a score indicating a closeness of a match between the search profile and the capabilities profile and one or more services and capabilities of the second device. The processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, EPROM memory, EEPROM memory, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers such as the server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 4:
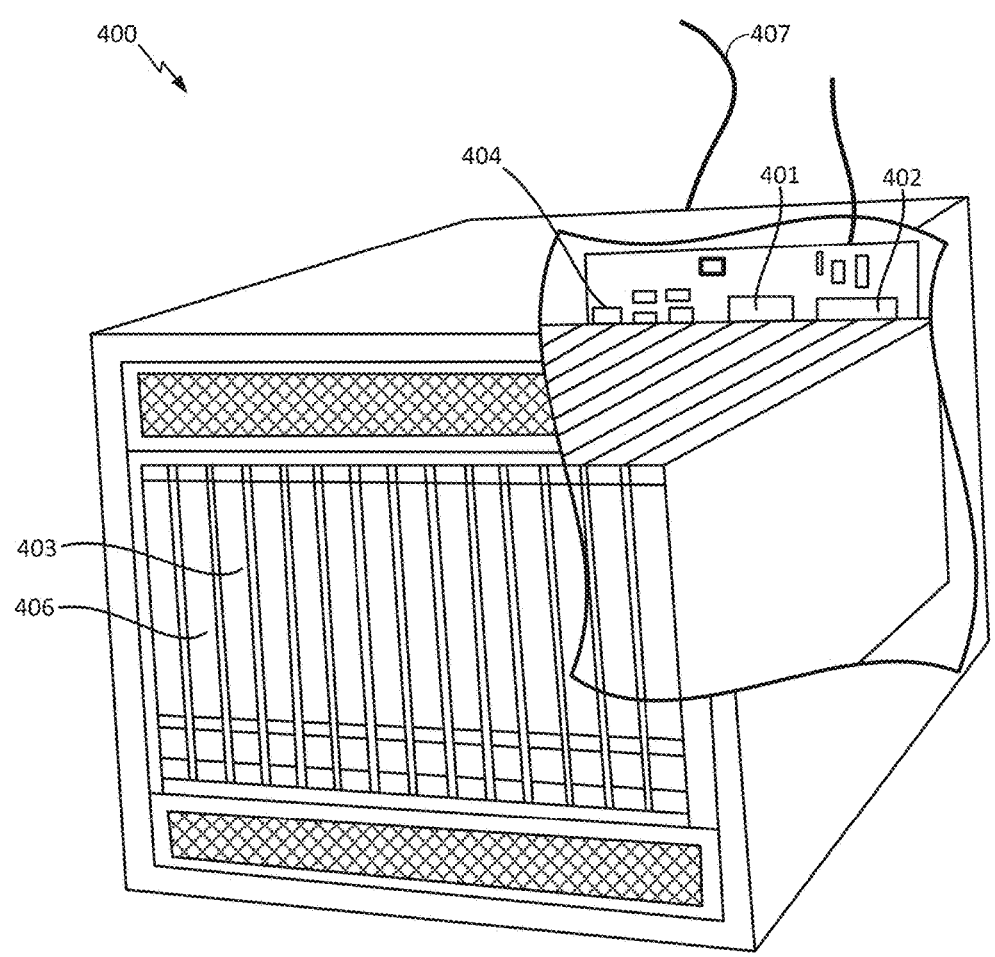
FIG. 4 illustrates a server in accordance with an embodiment of the disclosure.

The various embodiments may be implemented on any of a variety of commercially available server devices, such as server 400 illustrated in FIG. 4. In an example, the server 400 may correspond to one example configuration of the application server 170 described above. In FIG. 4, the server 400 includes a processor 400 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access ports 304 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to a UE implementation as in 205A or 205B as in FIG. 2.

In general, UEs, such as telephones, tablet computers, laptop and desktop computers, certain vehicles, etc., can be configured to connect with each other either locally (e.g., Bluetooth, local Wi-Fi, etc.) or remotely (e.g., via cellular networks, through the Internet, etc.). Furthermore, certain UEs may also support proximity-based peer-to-peer (P2P) communication using certain wireless networking technologies (e.g., Wi-Fi, Bluetooth, Wi-Fi Direct, etc.) that enable devices to make a one-to-one connection or simultaneously connect to a group that includes several devices in order to directly communicate with one another.

A P2P network is a type of decentralized and distributed network architecture in which individual nodes in the network (called "peers") act as both suppliers and consumers of resources. In contrast, in the centralized client-server model, client nodes request access to resources provided by central servers. In a P2P network, tasks (such as searching for files or streaming audio/video) are shared among multiple interconnected peer devices that each make a portion of their resources (such as processing power, disk storage, network bandwidth, etc.) directly available to other network participants, without the need for centralized coordination by a server.

Figure 5:
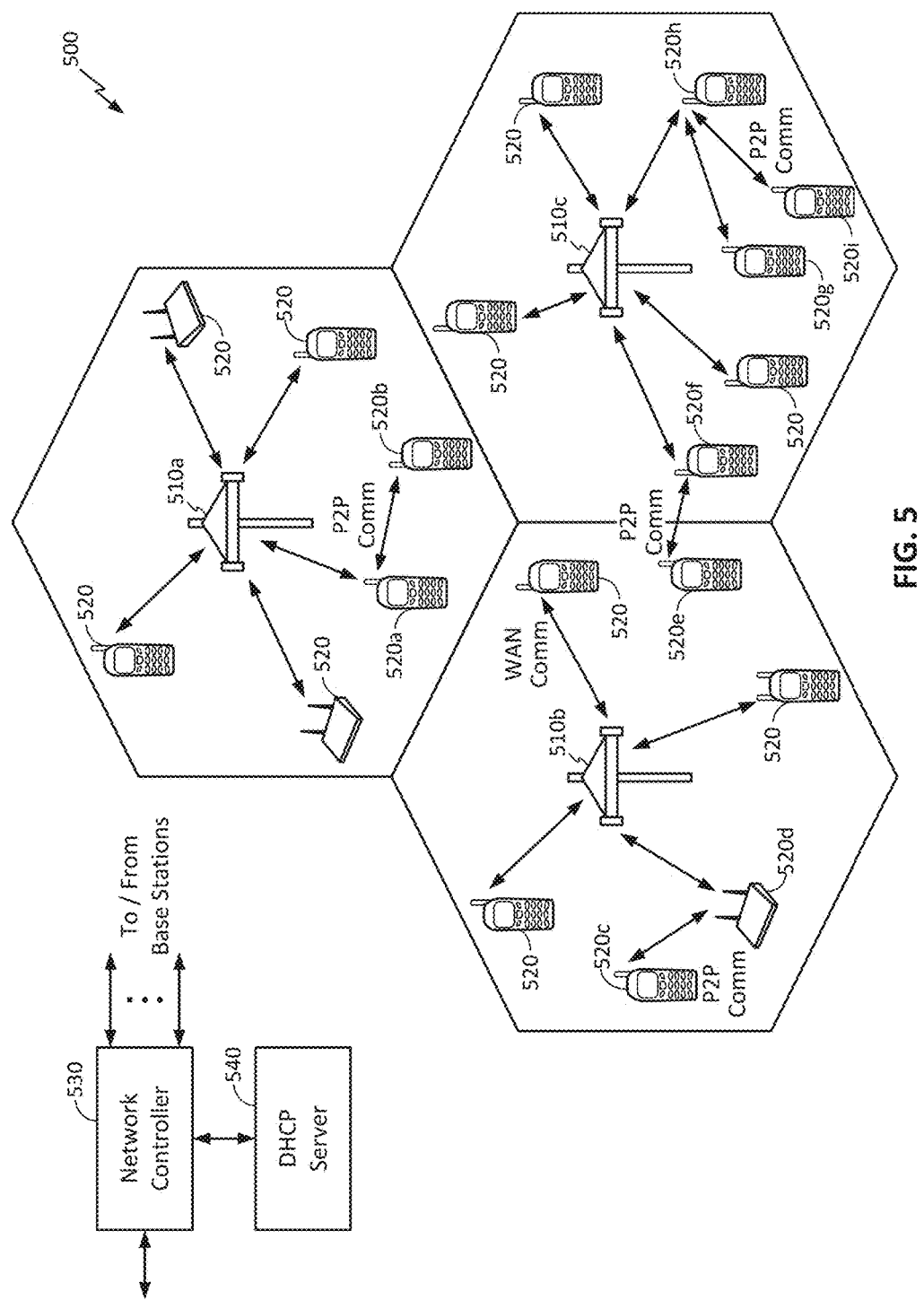
FIG. 5 illustrates a wireless communication network that may support discoverable peer-to-peer (P2P) services, in accordance with one aspect of the disclosure.

FIG. 5 illustrates an exemplary wireless communication network or WAN 500 that may support discoverable P2P services. For example, in one embodiment, the wireless communication network 500 may comprise an LTE network or another suitable WAN that includes various base stations 510 and other network entities. For simplicity, only three base stations 510a, 510b and 510c, one network controller 530, and one Dynamic Host Configuration Protocol (DHCP) server 540 are shown in FIG. 5. A base station 510 may be an entity that communicates with devices 520 and may also be referred to as a Node B, an evolved Node B (eNB), an access point, etc. Each base station 510 may provide communication coverage for a particular geographic area and may support communication for the devices 520 located within the coverage area. To improve network capacity, the overall coverage area of a base station 510 may be partitioned into multiple (e.g., three) smaller areas, wherein each smaller area may be served by a respective base station 510. In 3GPP, the term "cell" can refer to a coverage area of a base station 510 and/or a base station subsystem 510 serving this coverage area, depending on the context in which the term is used. In 3GPP2, the term "sector" or "cell-sector" can refer to a coverage area of a base station 510 and/or a base station subsystem 510 serving this coverage area. For clarity, the 3GPP concept of "cell" may be used in the description herein.

A base station 510 may provide communication coverage for a macro cell, a pico cell, a femto cell, and/or other cell types. A macro cell may cover a relatively large geographic area (e.g., several kilometers in radius) and may allow unrestricted access by devices 520 with service subscription. A pico cell may cover a relatively small geographic area and may allow unrestricted access by devices 520 with service subscription. A femto cell may cover a relatively small geographic area (e.g., a home) and may allow restricted access by devices 520 having association with the femto cell (e.g., devices 520 in a Closed Subscriber Group (CSG)). In the example shown in FIG. 5, wireless network 500 includes macro base stations 510a, 510b and 510c for macro cells. Wireless network 500 may also include pico base stations 510 for pico cells and/or home base stations 510 for femto cells (not shown in FIG. 5).

Network controller 530 may couple to a set of base stations 510 and may provide coordination and control for these base stations 510. Network controller 530 may be a single network entity or a collection of network entities that can communicate with the base stations via a backhaul. The base stations may also communicate with one another, e.g., directly or indirectly via wireless or wireline backhaul. DHCP server 540 may support P2P communication, as described below. DHCP server 540 may be part of wireless network 500, external to wireless network 500, run via Internet Connection Sharing (ICS), or any suitable combination thereof. DHCP server 540 may be a separate entity (e.g., as shown in FIG. 5) or may be part of a base station 510, network controller 530, or some other entity. In any case, DHCP server 540 may be reachable by devices 520 desiring to communicate peer-to-peer.

Devices 520 may be dispersed throughout wireless network 500, and each device 520 may be stationary or mobile. A device 520 may also be referred to as a node, user equipment (UE), a station, a mobile station, a terminal, an access terminal, a subscriber unit, etc. A device 520 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device 520 may communicate with base stations 510 in the wireless network 500 and may further communicate peer-to-peer with other devices 520. For example, as shown in FIG. 5, devices 520a and 520b may communicate peer-to-peer, devices 520c and 520d may communicate peer-to-peer, devices 520e and 520f may communicate peer-to-peer, and devices 520g, 520h, and 520i may communicate peer-to-peer, while remaining devices 520 may communicate with base stations 510. As further shown in FIG. 5, devices 520a, 520d, 520f, and 520h may also communicate with base stations 500, e.g., when not engaged in P2P communication or possibly concurrent with P2P communication.

In the description herein, WAN communication may refer to communication between a device 520 and a base station 510 in wireless network 500, e.g., for a call with a remote entity such as another device 520. A WAN device is a device 520 that is interested or engaged in WAN communication. P2P communication refers to direct communication between two or more devices 520, without going through any base station 510. A P2P device is a device 520 that is interested or engaged in P2P communication, e.g., a device 520 that has traffic data for another device 520 within proximity of the P2P device. Two devices may be considered to be within proximity of one another, for example, if each device 520 can detect the other device 520. In general, a device 520 may communicate with another device 520 either directly for P2P communication or via at least one base station 510 for WAN communication.

In one embodiment, direct communication between P2P devices 520 may be organized into P2P groups. More particularly, a P2P group generally refers to a group of two or more devices 520 interested or engaged in P2P communication and a P2P link refers to a communication link for a P2P group. Furthermore, in one embodiment, a P2P group may include one device 520 designated a P2P group owner (or a P2P server) and one or more devices 520 designated P2P clients that are served by the P2P group owner. The P2P group owner may perform certain management functions such as exchanging signaling with a WAN, coordinating data transmission between the P2P group owner and P2P clients, etc. For example, as shown in FIG. 5, a first P2P group includes devices 520a and 520b under the coverage of base station 510a, a second P2P group includes devices 520c and 520d under the coverage of base station 510b, a third P2P group includes devices 520e and 520f under the coverage of different base stations 510b and 510c, and a fourth P2P group includes devices 520g, 520h and 520i under the coverage of base station 510c. Devices 520a, 520d, 520f, and 520h may be P2P group owners for their respective P2P groups and devices 520b, 520c, 520e, 520g, and 520i may be P2P clients in their respective P2P groups. The other devices 520 in FIG. 5 may be engaged in WAN communication.

In one embodiment, P2P communication may occur only within a P2P group and may further occur only between the P2P group owner and the P2P clients associated therewith. For example, if two P2P clients within the same P2P group (e.g., devices 520g and 520i) desire to exchange information, one of the P2P clients may send the information to the P2P group owner (e.g., device 520h) and the P2P group owner may then relay transmissions to the other P2P client. In one embodiment, a particular device 520 may belong to multiple P2P groups and may behave as either a P2P group owner or a P2P client in each P2P group. Furthermore, in one embodiment, a particular P2P client may belong to only one P2P group or belong to multiple P2P group and communicate with P2P devices 520 in any of the multiple P2P groups at any particular moment. In general, communication may be facilitated via transmissions on the downlink and uplink. For WAN communication, the downlink (or forward link) refers to the communication link from base stations 510 to devices 520, and the uplink (or reverse link) refers to the communication link from devices 520 to base stations 510. For P2P communication, the P2P downlink refers to the communication link from P2P group owners to P2P clients and the P2P uplink refers to the communication link from P2P clients to P2P group owners. In certain embodiments, rather than using WAN technologies to communicate P2P, two or more devices may form smaller P2P groups and communicate P2P on a wireless local area network (WLAN) using technologies such as Wi-Fi, Bluetooth, or Wi-Fi Direct. For example, P2P communication using Wi-Fi, Bluetooth, Wi-Fi Direct, or other WLAN technologies may enable P2P communication between two or more mobile phones, game consoles, laptop computers, or other suitable communication entities.

Figure 6:
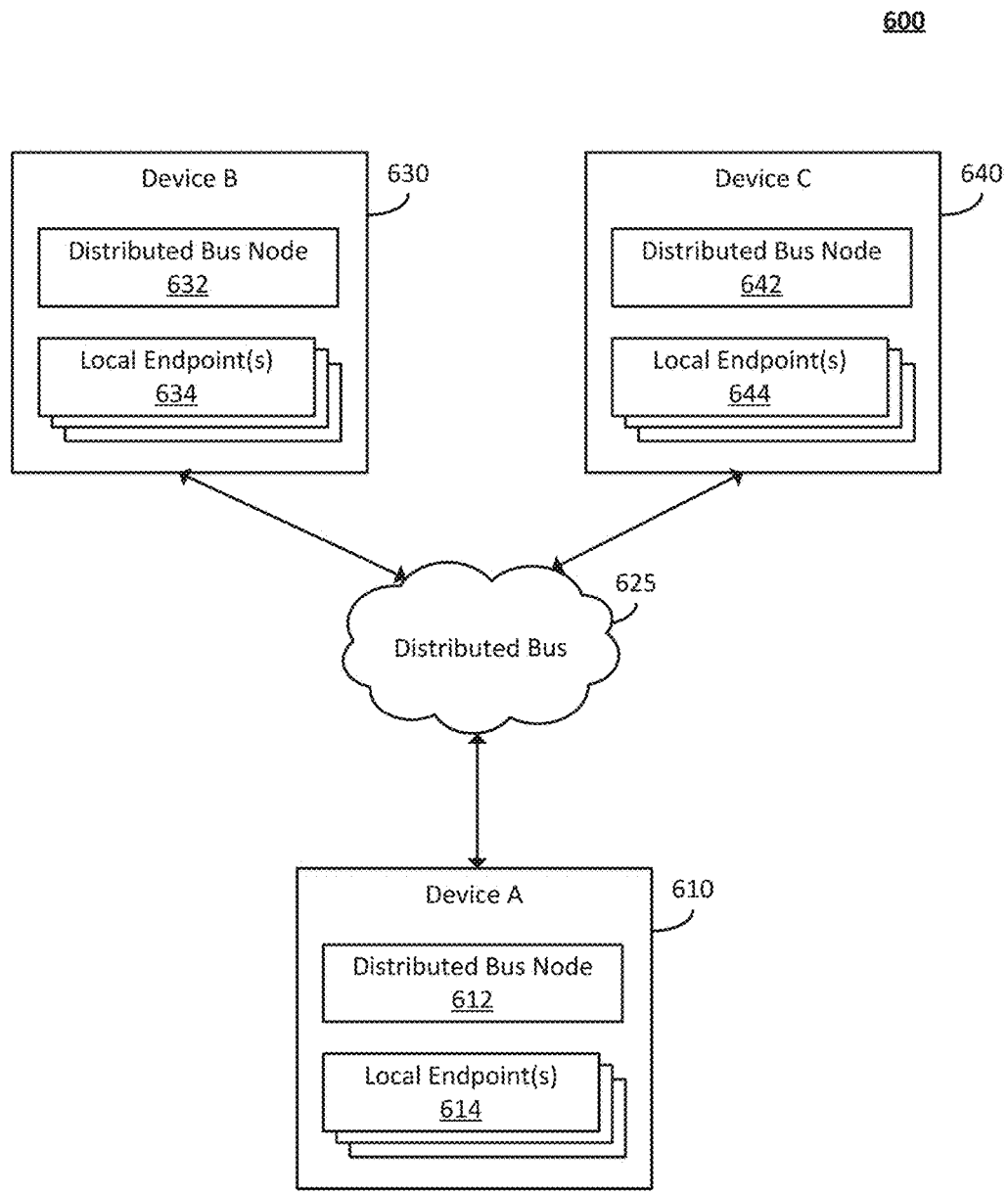
FIG. 6 illustrates an exemplary environment in which discoverable P2P services may be used to establish a proximity-based distributed bus over which various devices may communicate, in accordance with one aspect of the disclosure.

According to one aspect of the disclosure, FIG. 6 illustrates an exemplary environment 600 in which discoverable P2P services may be used to establish a proximity-based distributed bus over which various devices 610, 630, 640 may communicate. For example, in one embodiment, communications between applications and the like, on a single platform may be facilitated using an interprocess communication protocol (IPC) framework over the distributed bus 625, which may comprise a software bus used to enable application-to-application communications in a networked computing environment where applications register with the distributed bus 625 to offer services to other applications and other applications query the distributed bus 625 for information about registered applications. Such a protocol may provide asynchronous notifications and remote procedure calls (RPCs) in which signal messages (e.g., notifications) may be point-to-point or broadcast, method call messages (e.g., RPCs) may be synchronous or asynchronous, and the distributed bus 625 (e.g., a "daemon" bus process) may handle message routing between the various devices 610, 630, 640.

In one embodiment, the distributed bus 625 may be supported by a variety of transport protocols (e.g., Bluetooth, TCP/IP, Wi-Fi, CDMA, GPRS, UMTS, etc.). For example, according to one aspect, a first device 610 may include a distributed bus node 612 and one or more local endpoints 614, wherein the distributed bus node 612 may facilitate communications between local endpoints 614 associated with the first device 610 and local endpoints 634 and 644 associated with a second device 630 and a third device 640 through the distributed bus 625 (e.g., via distributed bus nodes 632 and 642 on the second device 630 and the third device 640). As will be described in further detail below with reference to FIG. 7, the distributed bus 625 may support symmetric multi-device network topologies and may provide a robust operation in the presence of device drops-outs. As such, the virtual distributed bus 625, which may generally be independent from any underlying transport protocol (e.g., Bluetooth, TCP/IP, Wi-Fi, etc.) may allow various security options, from unsecured (e.g., open) to secured (e.g., authenticated and encrypted), wherein the security options can be used while facilitating spontaneous connections with among the first device 610, the second device 630, and the third device 640 without intervention when the various devices 610, 630, 640 come into range or proximity to each other.

Figure 7:
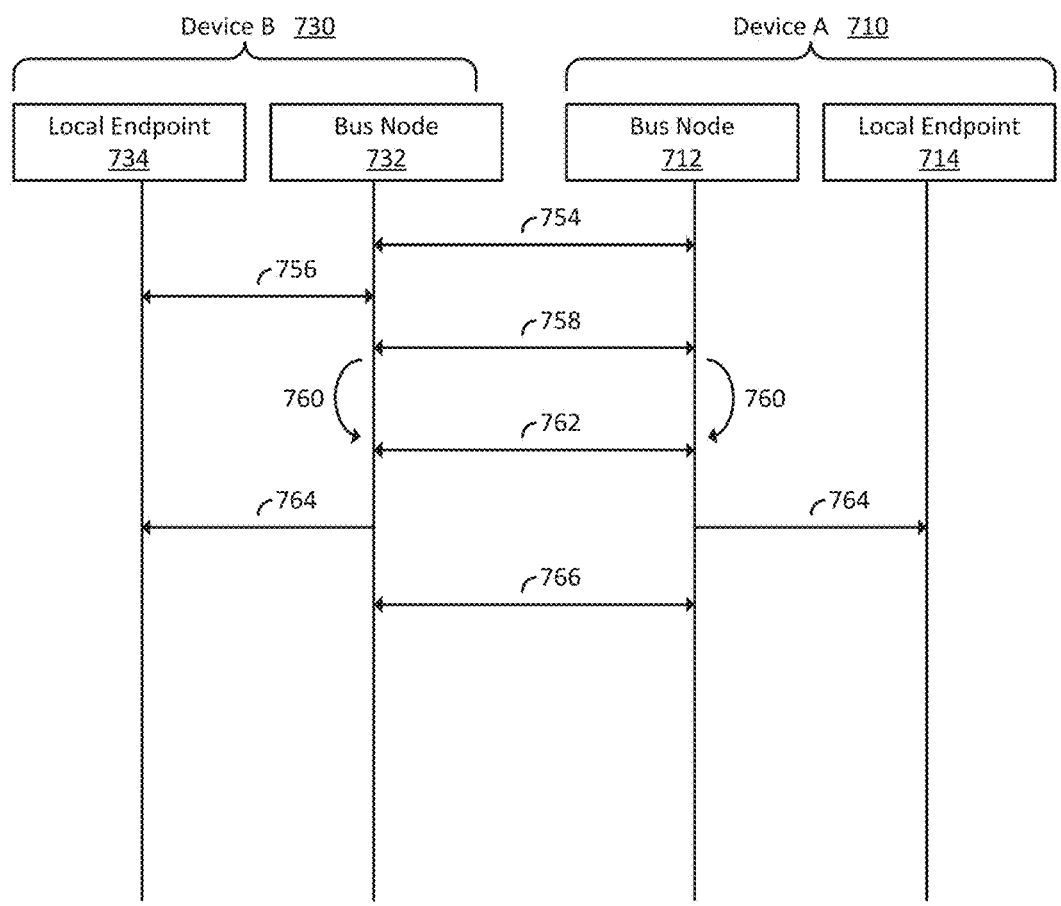
FIG. 7 illustrates an exemplary message sequence in which discoverable P2P services may be used to establish a proximity-based distributed bus over which various devices may communicate, in accordance with one aspect of the disclosure.

According to one aspect of the disclosure, FIG. 7 illustrates an exemplary message sequence 700 in which discoverable P2P services may be used to establish a proximity-based distributed bus over which a first device ("Device A") 710 and a second device ("Device B") 730 may communicate. Generally, Device A 710 may request to communicate with Device B 730, wherein Device A 710 may a include local endpoint 714 (e.g., a local application, service, etc.), which may make a request to communicate in addition to a bus node 712 that may assist in facilitating such communications. Further, Device B 730 may include a local endpoint 734 with which the local endpoint 714 may be attempting to communicate in addition to a bus node 732 that may assist in facilitating communications between the local endpoint 714 on the Device A 710 and the local endpoint 734 on Device B 730.

In one embodiment, the bus nodes 712 and 732 may perform a suitable discovery mechanism at message sequence step 754. For example, mechanisms for discovering connections supported by Bluetooth, TCP/IP, UNIX, or the like may be used. At message sequence step 756, the local endpoint 714 on Device A 710 may request to connect to an entity, service, endpoint etc, available through bus node 712. In one embodiment, the request may include a request-and-response process between local endpoint 714 and bus node 712. At message sequence step 758, a distributed message bus may be formed to connect bus node 712 to bus node 732 and thereby establish a P2P connection between Device A 710 and Device B 730. In one embodiment, communications to form the distributed bus between the bus nodes 712 and 732 may be facilitated using a suitable proximity-based P2P protocol (e.g., the AllJoyn™ software framework designed to enable interoperability among connected products and software applications from different manufacturers to dynamically create proximal networks and facilitate proximal P2P communication). Alternatively, in one embodiment, a server (not shown) may facilitate the connection between the bus nodes 712 and 732. Furthermore, in one embodiment, a suitable authentication mechanism may be used prior to forming the connection between bus nodes 712 and 732 (e.g., SASL authentication in which a client may send an authentication command to initiate an authentication conversation). Still further, during message sequence step 758, bus nodes 712 and 732 may exchange information about other available endpoints (e.g., local endpoints 644 on Device C 640 in FIG. 6). In such embodiments, each local endpoint that a bus node maintains may be advertised to other bus nodes, wherein the advertisement may include unique endpoint names, transport types, connection parameters, or other suitable information.

In one embodiment, at message sequence step 760, bus node 712 and bus node 732 may use obtained information associated with the local endpoints 734 and 714, respectively, to create virtual endpoints that may represent the real obtained endpoints available through various bus nodes. In one embodiment, message routing on the bus node 712 may use real and virtual endpoints to deliver messages. Further, there may one local virtual endpoint for every endpoint that exists on remote devices (e.g., Device A 710). Still further, such virtual endpoints may multiplex and/or de-multiplex messages sent over the distributed bus (e.g., a connection between bus node 712 and bus node 732). In one aspect, virtual endpoints may receive messages from the local bus node 712 or 732, just like real endpoints, and may forward messages over the distributed bus. As such, the virtual endpoints may forward messages to the local bus nodes 712 and 732 from the endpoint multiplexed distributed bus connection. Furthermore, in one embodiment, virtual endpoints that correspond to virtual endpoints on a remote device may be reconnected at any time to accommodate desired topologies of specific transport types. In such an aspect, UNIX based virtual endpoints may be considered local and as such may not be considered candidates for reconnection. Further, TCP-based virtual endpoints may be optimized for one hop routing (e.g., each bus node 712 and 732 may be directly connected to each other). Still further, Bluetooth-based virtual endpoints may be optimized for a single pico-net (e.g., one master and n slaves) in which the Bluetooth-based master may be the same bus node as a local master node.

At message sequence step 762, the bus node 712 and the bus node 732 may exchange bus state information to merge bus instances and enable communication over the distributed bus. For example, in one embodiment, the bus state information may include a well-known to unique endpoint name mapping, matching rules, routing group, or other suitable information. In one embodiment, the state information may be communicated between the bus node 712 and the bus node 732 instances using an interface with local endpoints 714 and 734 communicating with using a distributed bus based local name. In another aspect, bus node 712 and bus node 732 may each may maintain a local bus controller responsible for providing feedback to the distributed bus, wherein the bus controller may translate global methods, arguments, signals, and other information into the standards associated with the distributed bus. At message sequence step 764, the bus node 712 and the bus node 732 may communicate (e.g., broadcast) signals to inform the respective local endpoints 714 and 734 about any changes introduced during bus node connections, such as described above. In one embodiment, new and/or removed global and/or translated names may be indicated with name owner changed signals. Furthermore, global names that may be lost locally (e.g., due to name collisions) may be indicated with name lost signals. Still further, global names that are transferred due to name collisions may be indicated with name owner changed signals and unique names that disappear if and/or when the bus node 712 and the bus node 732 become disconnected may be indicated with name owner changed signals.

As used above, well-known names may be used to uniquely describe local endpoints 714 and 734. In one embodiment, when communications occur between Device A 710 and Device B 730, different well-known name types may be used. For example, a device local name may exist only on the bus node 712 associated with Device A 710 to which the bus node 712 directly attaches. In another example, a global name may exist on all known bus nodes 712 and 732, where only one owner of the name may exist on all bus segments. In other words, when the bus node 712 and bus node 732 are joined and any collisions occur, one of the owners may lose the global name. In still another example, a translated name may be used when a client is connected to other bus nodes associated with a virtual bus. In such an aspect, the translated name may include an appended end (e.g., a local endpoint 714 with well-known name "org.foo" connected to the distributed bus with Globally Unique Identifier "1234" may be seen as "G1234.org.foo").

At message sequence step 766, the bus node 712 and the bus node 732 may communicate (e.g., broadcast) signals to inform other bus nodes of changes to endpoint bus topologies. Thereafter, traffic from local endpoint 714 may move through virtual endpoints to reach intended local endpoint 734 on Device B 730. Further, in operation, communications between local endpoint 714 and local endpoint 734 may use routing groups. In one aspect, routing groups may enable endpoints to receive signals, method calls, or other suitable information from a subset of endpoints. As such, a routing name may be determined by an application connected to a bus node 712 or 732. For example, a P2P application may use a unique, well-known routing group name built into the application. Further, bus nodes 712 and 732 may support registering and/or de-registering of local endpoints 714 and 734 with routing groups. In one embodiment, routing groups may have no persistence beyond a current bus instance. In another aspect, applications may register for their preferred routing groups each time they connect to the distributed bus. Still further, groups may be open (e.g., any endpoint can join) or closed (e.g., only the creator of the group can modify the group). Yet further, a bus node 712 or 732 may send signals to notify other remote bus nodes or additions, removals, or other changes to routing group endpoints. In such embodiments, the bus node 712 or 732 may send a routing group change signal to other group members whenever a member is added and/or removed from the group. Further, the bus node 712 or 732 may send a routing group change signal to endpoints that disconnect from the distributed bus without first removing themselves from the routing group.

The P2P software running on each peer device typically provides service advertisement and discovery, session setup, session management (e.g., join/leave), and data transfer. A problem with current P2P software is that there is no perfect solution to setup the appropriate wireless network connectivity for a peer device. Current P2P software solutions assume that either the user manually sets up network connectivity (e.g., WiFi, WiFi Direct, LTE Direct, Bluetooth, etc.) among peer devices before startup, or the application hard-code sets up network connectivity among the peer devices before startup. However, the former requires the manual intervention of the user, and the latter introduces additional complexity and is more prone to error.

Another problem with current P2P software is that a peer device may have difficulty finding an appropriate supplier peer device. During the advertisement/discovery period, supplier peer devices usually advertise "well-known service name" as a string, and consumer peer devices discover the supplier peer device using the prefix of this well-known name. However, with more and more peer devices having P2P service capability, this simple advertisement/discovery mechanism makes it difficult for consumer peer devices to find appropriate supplier peer devices.

For example, assume a peer device A wants to find and download an image in the .jpg file format. A peer device B can provide an image download service with the .jpg file format, and a peer device C can provide an image download service with the .png file format. Both peer devices B and C advertise that they can support the image download service. In response, peer device A joins peer device C's P2P session and makes a remote call to download the image. However, only after spending time and consuming power during the wireless link setup, will the peer device A discover that peer device C has the image in the wrong file format.

To address the problem of setting up the appropriate wireless network connectivity for peer devices, various solutions use near field communication (NFC) to enable a specific network connection for a specific data transfer. For example, one solution uses NFC to automatically enable Bluetooth on both peer devices, instantly pair them, transfer the data, and then disable the Bluetooth connection once the data transfer is complete. Another solution uses NFC to enable Wi-Fi Direct instead of Bluetooth, resulting in a quicker transfer time. Both solutions partly address the problem of setting up the appropriate wireless network connection, but neither addresses the problem that a peer device may have difficulty finding an appropriate supplier peer device.

NFC is a standardized short-range wireless connectivity technology designed to cover a range of proximity use cases that developed out of the RFID-style contactless identification and interconnection technologies. It operates at short ranges (e.g., less than or equal to 10 cm theoretically, or 1-4 cm typically) and low speeds (e.g., 106, 216, or 414 kbps). Setup times are less than 0.1 seconds and data exchange speeds can be up to 424 kbps. An NFC initiator acts as a master device and starts an NFC communication session. An NFC target acts as a slave device and is typically a passive RFID tag or device.

Figure 8:
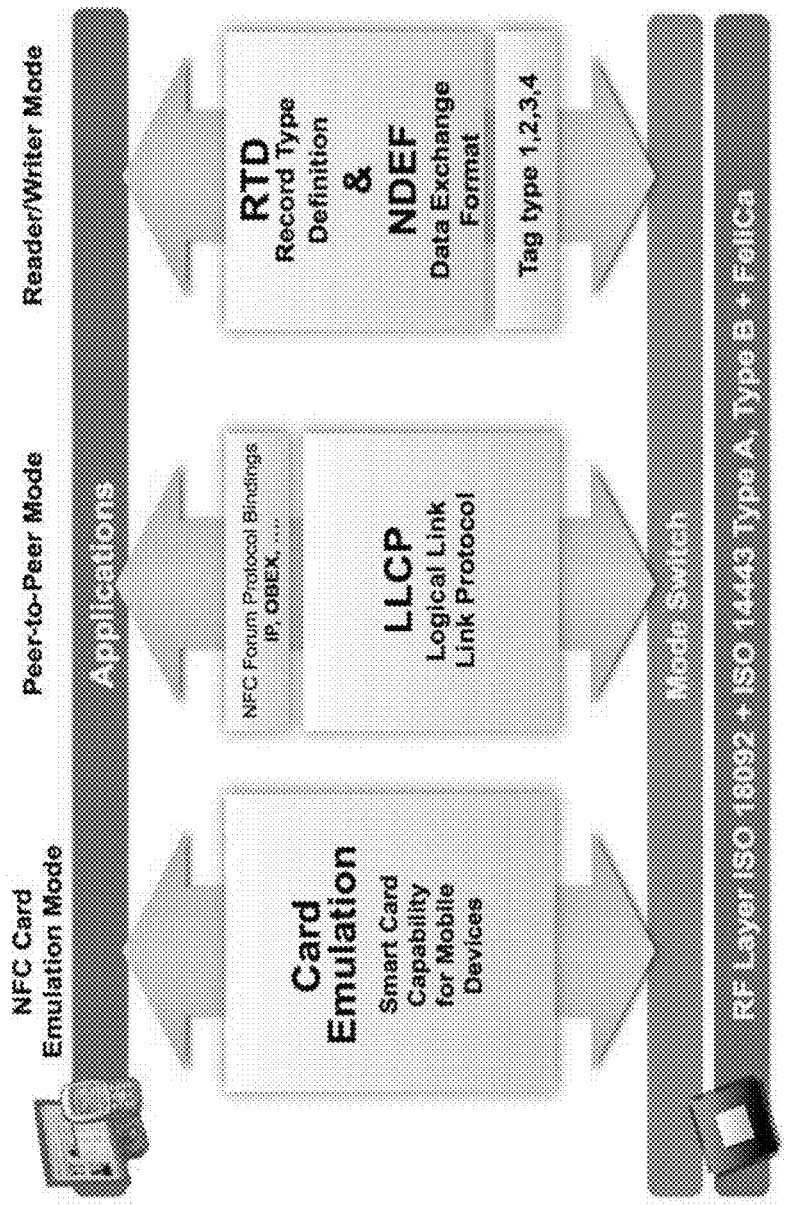
FIG. 8 illustrates exemplary operating modes for a near field communication (NFC)-enabled device.

There are a number of use cases for NFC. NFC can be used to make contactless transactions via card emulation. For example, card emulation can be used to make payments, for ticketing, loyalty tracking, building access, and in government identification cards. NFC can also be used to access information. For example, NFC-enabled devices can discover digital content from RFID tags placed in public locations, such as on posters or signs, or, in some cases, write data to RFID tags. NFC can additionally be used to connect electronic devices. For example, NFC can be used to enable device pairing, such as over Bluetooth or WiFi Direct, and to share contact lists. FIG. 8 illustrates these exemplary operating modes for an NFC-enabled device.

Using NFC can enhance the user experience for P2P software solutions. Before establishing/configuring a high power consumption network connection (e.g., WiFi, Bluetooth, WiFi Direct, LTE Direct, etc.) between two peer devices, an NFC-enabled peer device can perform a "one touch" search to find an appropriate supplier peer device for a P2P service and to determine the appropriate high power consumption wireless network connection to establish with the supplier peer device.

An NFC-enabled consumer peer device can perform a "one touch" search to find an appropriate supplier peer device based on various criteria defined in a consumer peer device search profile and capabilities profile. The search profile can include criteria describing the service and/or media file for which the consumer peer device is searching. The capabilities profile can include the consumer peer device's data exchange compatibility, such as image format, video format, audio format, payload size, bandwidth, power efficiency, etc., and supported network connectivity, such as WiFi, WiFi Direct, LTE Direct, Bluetooth, etc. A search engine on a supplier peer device searches a P2P search engine service index database for a P2P service that matches the consumer peer device's search profile and capabilities profile and provides a score rank for any matching P2P services. The score rank indicates how closely the P2P service on the supplier peer device matches the profiles of the consumer peer device, and/or how compatible the supplier peer device and the P2P service are with the consumer peer device and the search and capabilities profiles. An "appropriate" supplier peer device is a peer device that has a P2P service with a score rank above a threshold. The supplier peer device can also include a ranking of its available services so that the consumer peer device can pick the best service for what it is attempting to do, where more than one service may fit the search criteria.

This "one touch" search may be considered a "touch to know" or "one touch awareness," as it allows the NFC-enabled consumer peer device to discover an appropriate NFC-enabled supplier peer device without having to first establish a high power consumption wireless network connection with the supplier peer device. The consumer peer device may search any number of supplier peer devices to find an appropriate supplier peer device. The consumer peer device may also search any number of supplier peer devices to determine which supplier peer device has the highest score rank.

Once an NFC-enabled consumer peer device has identified an appropriate supplier peer device, it can perform a "one touch" configuration (or "touch to configure") to select an appropriate wireless network connection based on various criteria that may also be defined in the consumer peer device capabilities profile, such as supported network connections, payload size, bandwidth, power efficiency, etc. The consumer peer device and the supplier peer device can then negotiate the optimal network configuration without user intervention. For example, if downloading a single image file, the devices may negotiate to use a Bluetooth connection, but if downloading multiple video files, the devices may negotiate to use a Wi-Fi connection instead.

NFC-enabled peer devices can setup network connectivity and a P2P session without manual user intervention. The NFC P2P mode can simplify the discovery process by eliminating the inquiry process. Users can touch two devices together ("one touch") to exchange appropriate network configuration and service name information via the device's NFC tags. This removes the need for the user(s) to manually setup a network link and service from a (potentially long) list. The result is a more seamless wireless user experience.

The NFC-enabled consumer device performs the first "touch to know" to discover what services are available, not what files are available. If the NFC-enabled peer device is looking for a file, it first attempts to find which other NFC-enabled peer devices have a file sharing service available using "touch to know." Then, after selecting a peer device, it touches to configure and establishes a file sharing service. At that time, it can determine whether or not the other peer device has or has access to the file for which the first device is searching.

The network connection can also be adjusted based on system performance during the interaction of the peer devices and/or the addition of new peer devices into the P2P group.

Figure 9:
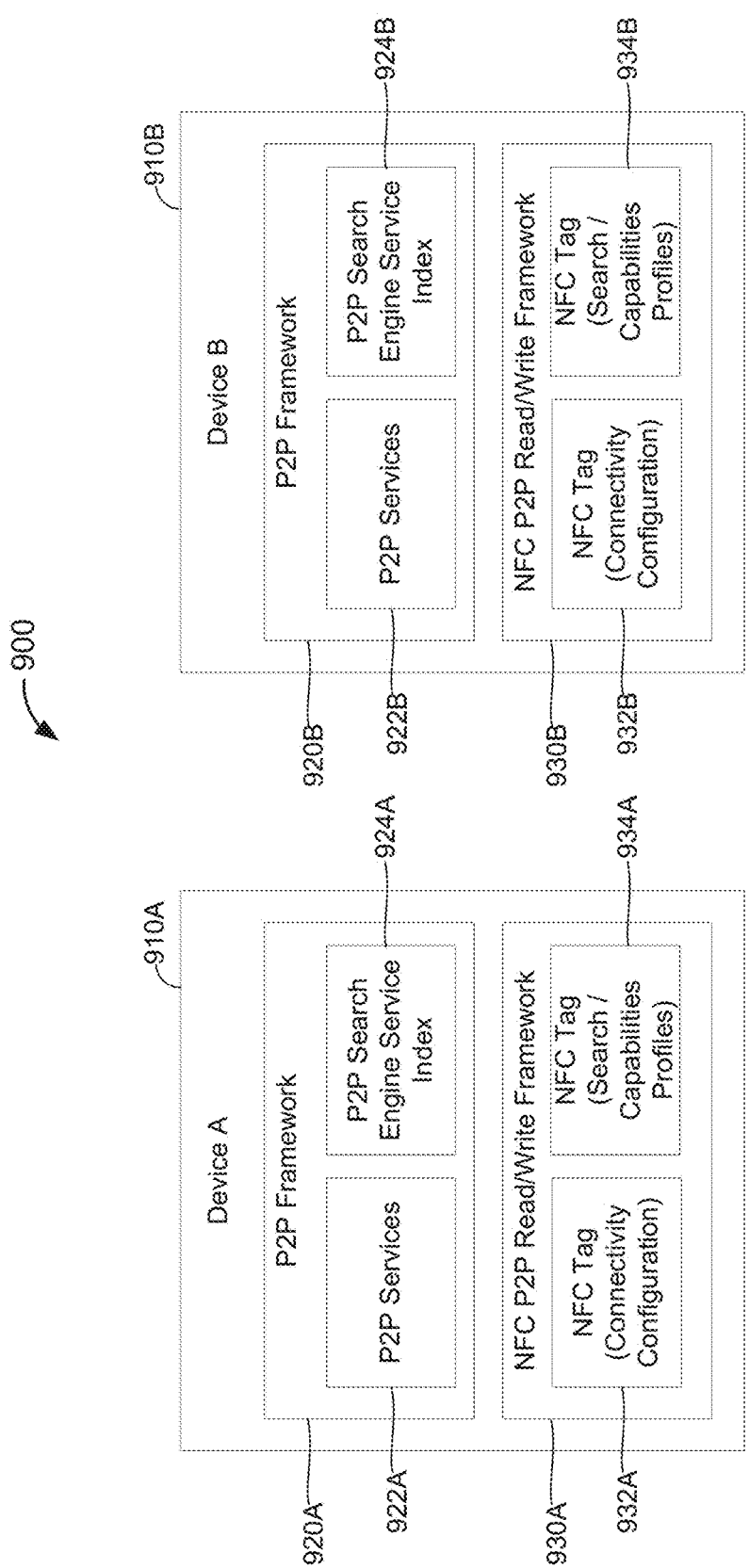
FIG. 9 illustrates an exemplary system according to at least one aspect of the disclosure.

FIG. 9 illustrates an exemplary system 900 according to at least one aspect of the disclosure. An NFC-enabled peer device A 910A includes a P2P framework 920A that includes various P2P services 922A and a P2P search engine service index 924A. The device A 910A also includes an NFC P2P read/write framework 930A that includes NFC tags 932A and 934A. The NFC tag 932A includes connectivity configuration details for the various wireless network connectivity options that the device A 910A can support. The NFC tag 934A includes the search profile and capabilities profile for the device A 910A.

An NFC-enabled peer device B 910B includes a P2P framework 920B that includes P2P services 922B and a P2P search engine service index 924B. The device B 910B also includes an NFC P2P read/write framework 930B that includes NFC tags 932B and 934B. The NFC tag 932B includes connectivity configuration details for the various wireless network connectivity options that the device B 910B can support. The NFC tag 934B includes the search profile and capabilities profile for the device B 910B.

Device A 910A and device B 910B initially communicate with each other over NFC by "touching." Note that "touching" does not require physical contact; rather, the devices A 910A and B 910B need only be brought close enough to each other that they can communicate via NFC. Each device may be in an NFC "touch to send" mode and operating at a low power consumption level (with screen on and unlocked). In the example of FIG. 9, device A 910A is a consumer peer device and device B 910B is a supplier peer device.

The P2P services 922A and 922B (the P2P services available on each device) register their capabilities in the P2P search engine service index 924A and 924B, respectively. A search engine algorithm is implemented using each P2P search engine service index 924A and 924B. Both devices A 910A and B 910B store the service profile and wireless network connection configurations as tags.

When device A 910A and device B 910B first "touch," device A 910A, as the consumer peer device, pushes its search profile and capabilities profile to device B 910B. Device B 910B's search algorithm searches the P2P services 922B to determine whether or not any of the P2P services 922B match device A 910A's search profile. If any of the P2P services 922B match device A 910A's search profile, device B 910B assigns a score rank to the P2P service and pushes the matching service name and corresponding search score to device A 910A. The device B 910B can also push a proposed network configuration and corresponding search score. The search score indicates the compatibility of the proposed network configuration to the network configuration criteria included in the capabilities profile of device A 910A.

Although not illustrated in FIG. 9, there may be any number of NFC-enabled peer devices in system 900. Device A 910A may touch any number of these other peer devices to find a matching P2P service or to find the P2P service with the highest search score.

If one of the P2P services 922B on device B 910B has the highest search score, that is, has the closest match to device A 910A's search profile, then both device A 910A and device B 910B may "touch" again to enable/configure network connectivity with the appropriate network configuration tags. The "appropriate" network configuration tags are pushed from device B 910B to device A 910A, and include the network link setup information for device B 910B, such as the WiFi RSSI, password, etc. The devices A 910A and B 910B can then communicate using P2P software, including setting up, joining, or quitting a P2P session with the appropriate service name tags. The "appropriate" service name tags are pushed from device B 910B to device A 910A, and include the P2P service name of device B 910B.

Figure 10:
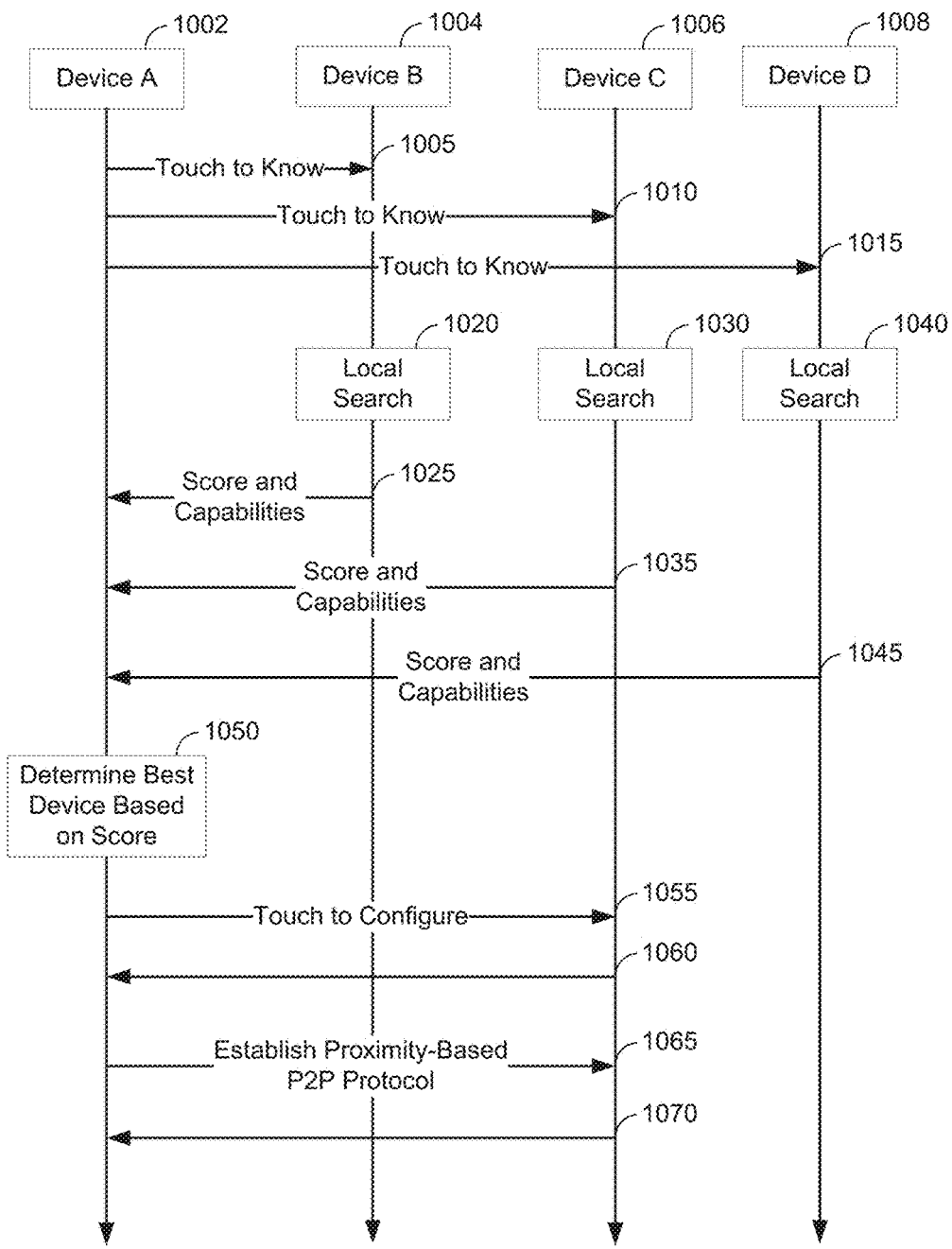
FIG. 10 illustrates an exemplary call flow showing an NFC-enabled peer Device A interacting with other NFC-enabled peer devices.

FIG. 10 illustrates an exemplary call flow showing a Device A 1002 interacting with other devices 1004-1008. Devices 1002-1008 are NFC-enabled peer devices such as peer devices A 910A and B 910B in FIG. 9.

In the example of FIG. 10, Device A 1002 wishes to find a particular media file, such as a video, and can communicate with other peer devices over Bluetooth and/or WiFi, for example. At 1005, Device A 1002 performs an NFC "touch to know" with an NFC-enabled peer Device B 1004. At 1015, Device A 1002 performs another NFC "touch to know" with another NFC-enabled peer Device C 1006. At 1020, Device A 1002 performs a third NFC "touch to know" with yet another NFC-enabled peer Device D 1008. Although FIG. 10 illustrates Device A 1002 interacting with three other NFC-enabled peer devices, Device A 1002 may perform an NFC "touch to know" with any number of other devices to find the desired media file.

With each "touch to know," Device A 1002 sends its search profile and capabilities profile to the other device. Upon receiving the search and capabilities profiles from Device A 1002, at 1020, Device B 1004 performs a local search to determine whether or not it has any services meeting the criteria in the received search profile. At 1030 and 1040, Devices C 1006 and D 1008 perform similar local searches, respectively.

In the example of FIG. 10, Device B 1004 may have one video matching the keyword(s) in the received search profile in the .mp4 format and be able to communicate over Bluetooth and/or WiFi. However, at 1025, Device B 1004 simply conveys its capabilities to Device A 1002, plus the corresponding search score. Device C 1006 may have two videos matching the keyword(s) in the received search profile in the 0.3 gp format and be able to communicate over Bluetooth and/or WiFi. Again however, at 1035, Device C 1006 simply conveys its capabilities to Device A 1002, plus the corresponding search score. Device D 1008 may have three videos matching the keyword(s) in the received search profile in the .mp4 and 0.3 gp formats and be able to communicate over Bluetooth. However, at 1045, Device D 1008 simply conveys its capabilities to Device A 1002, plus the corresponding search score.

At 1050, Device A 1002 determines the best device from which to retrieve the desired media file based on the received search scores. The search scores may consider factors such as media formats, bandwidth, resolution, etc. In the example of FIG. 10, the device with the best search score is Device C 1006.

At 1055 and 1060, Device A 1002 performs an NFC "touch to configure" with Device C 1006. This "touch to configure" communicates what network configuration to use to transfer the media file from Device C 1006 to Device A 1002. In the example of FIG. 10, the devices may choose WiFi to transfer the media file since it is a video and will require more bandwidth.

At 1065 and 1070, once connected over a local WiFi connection, Device A 1002 and Device C 1006 can establish a proximity-based P2P protocol, such as the AllJoyn™ software framework. Device C 1006 can then transmit the requested media file to Device A 1002 using the established proximity-based P2P protocol.

Figure 11:
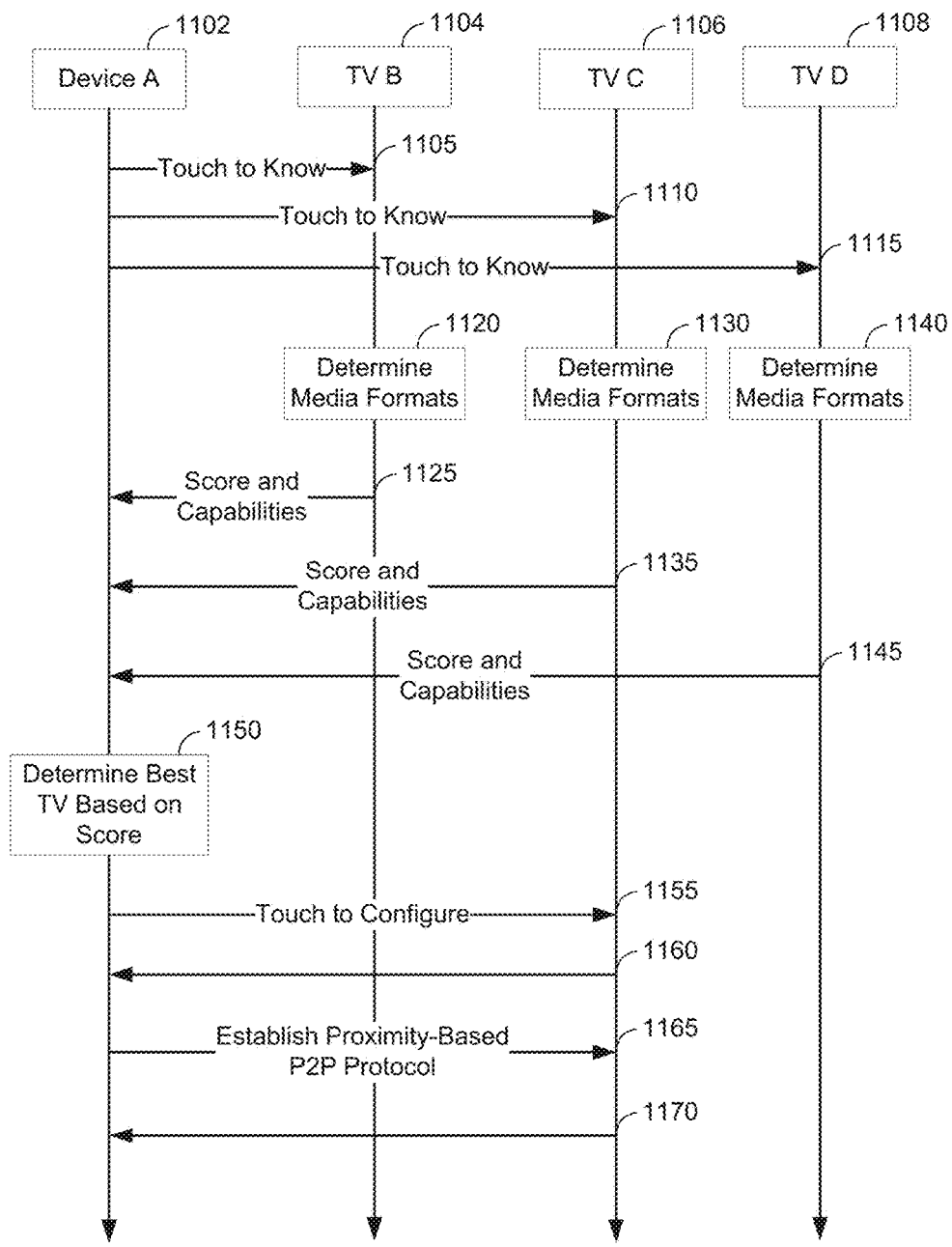
FIG. 11 illustrates an exemplary call flow showing an NFC-enabled peer Device A interacting with NFC-enabled peer device televisions.

FIG. 11 illustrates an exemplary call flow showing a Device A 1002 interacting with devices 1104-1108. Devices 1102-1108 are NFC-enabled peer devices, such as peer devices A 910A and B 910B in FIG. 9. In the example of FIG. 11, devices 1104-1108 are NFC-enabled peer device televisions.

Referring to FIG. 11, Device A 1102 wishes to determine whether or not it can interact with an NFC-enable television (TV) to, for example, play a slideshow. At 1105, Device A 1102 performs an NFC "touch to know" with an NFC-enabled TV 1104. At 1115, Device A 1102 performs another NFC "touch to know" with another NFC-enabled TV B 1106. At 1120, Device A 1102 performs a third NFC "touch to know" with yet another NFC-enabled TV C 1108. Although FIG. 11 illustrates Device A 1102 interacting with three other NFC-enabled TVs, Device A 1102 may perform an NFC "touch to know" with any number of other devices.

With each "touch to know," Device A 1102 sends its search profile and capabilities profile to the TVs 1104-1108. Upon receiving the search and capabilities profiles from Device A 1102, at 1120, TV A 1104 determines the media formats it can support. At 1130 and 1140, TVs B 1006 and C 1108 perform similar determinations, respectively. Each TV 1104-1108 may support different interfaces and services.

At 1125, TV B 1104 sends Device A 1102 its supported interfaces and services (i.e., its capabilities), plus the corresponding search score. At 1135 and 1145, Device B 1106 and Device C 1108 do the same.

At 1150, Device A 1102 determines the best TV based on the search score. The search scores may consider factors such as media formats, bandwidth, resolution, etc. In the example of FIG. 11, the TV with the best search score is TV B 1106.

At 1155 and 1160, Device A 1102 performs an NFC "touch to configure" with TV B 1106. This "touch to configure" communicates what network configuration to use to play the slideshow, for example, on Device B 1106. In the example of FIG. 11, the devices may choose to communicate via Bluetooth.

At 1165 and 1170, once connected over a Bluetooth connection, Device A 1102 and Device B 1106 can establish a proximity-based P2P protocol, such as the AllJoyn™ software framework. Device B 1106 can then play the slideshow stored on Device A 1002 using the established proximity-based P2P protocol.

Figure 12:
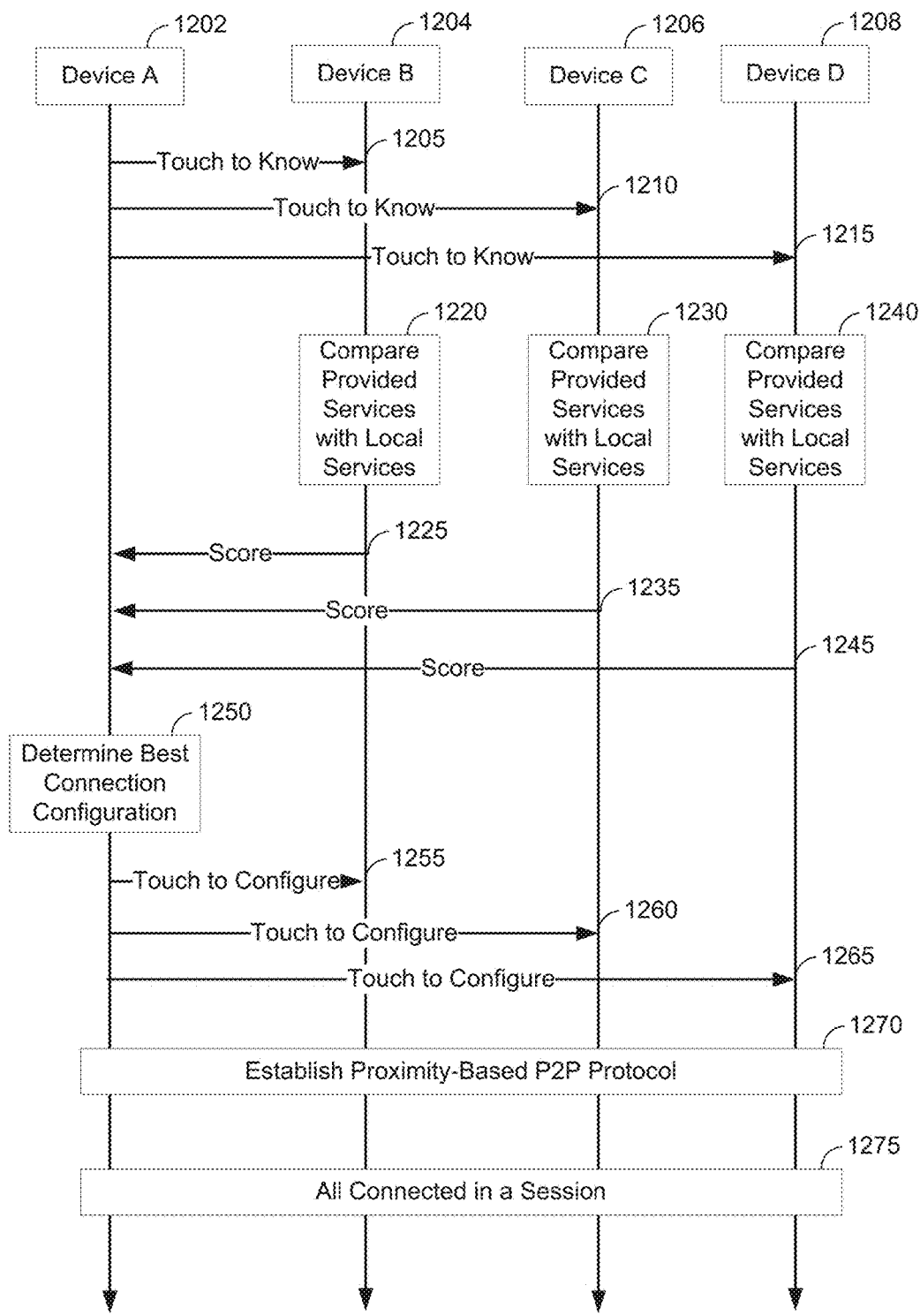
FIG. 12 illustrates an exemplary call flow showing various NFC-enabled peer devices interacting to form a session.

FIG. 12 illustrates an exemplary call flow showing various devices 1202-1208 interacting to form a session. Devices 1202-1208 are NFC-enabled peer devices, such as peer devices A 910A and B 910B in FIG. 9.

In the example of FIG. 12, NFC-enabled peer devices A 1202, B, 1204, C 1206, and D 108 wish to interoperate and communicate with each other to interact using a common proximity-based P2P protocol, for example. At 1205, Device A 1202 performs an NFC "touch to know" with Device B 1204. At 1215, Device A 1202 performs another NFC "touch to know" with Device C 1206. At 1020, Device A 1202 performs a third NFC "touch to know" with Device D 1208. Although FIG. 12 illustrates Device A 1202 interacting with three other NFC-enabled peer devices, Device A 1202 may perform an NFC "touch to know" with any number of other devices to establish the session.

With each "touch to know," Device A 1202 sends its search profile and capabilities profile to the other device. Upon receiving the search and capabilities profiles from Device A 1202, at 1220, Device B 1204 compares its local services with the services listed in the received search profile. At 1230 and 1240, Devices C 1206 and D 1208, respectively, perform similar local searches.

In the example of FIG. 12, Device A 1202 may support controls, events, and notifications. Device B 1204 may support a control panel function, events, and notifications. At 1225, Device B 1204 conveys this information to Device A 1202, plus the corresponding search score. Device C 1206 may support events and notifications. At 1235, Device C 1206 conveys this information to Device A 1202, plus the corresponding search score. Device D 1208 may support a time function, events, and notifications. At 1245, Device D 1208 conveys this information to Device A 1202, plus the corresponding search score.

At 1250, Device A 1202 determines how best to form a connection among the devices. Device A 1202 may also determine how the services can be linked together for a higher level of consumer interaction.

At 1255, Device A 1202 performs an NFC "touch to configure" with Device B 1204. At 1260, Device A 1202 performs an NFC "touch to configure" with Device C 1206. At 1265, Device A 1202 performs an NFC "touch to configure" with Device D 1208. These "touch to configures" communicates what network configuration to establish the session among the devices.

At 1270, once connected, the devices can establish a proximity-based P2P protocol, such as the AllJoyn™ software framework. At 1275, the devices are all connected to the same session.

Figure 13:
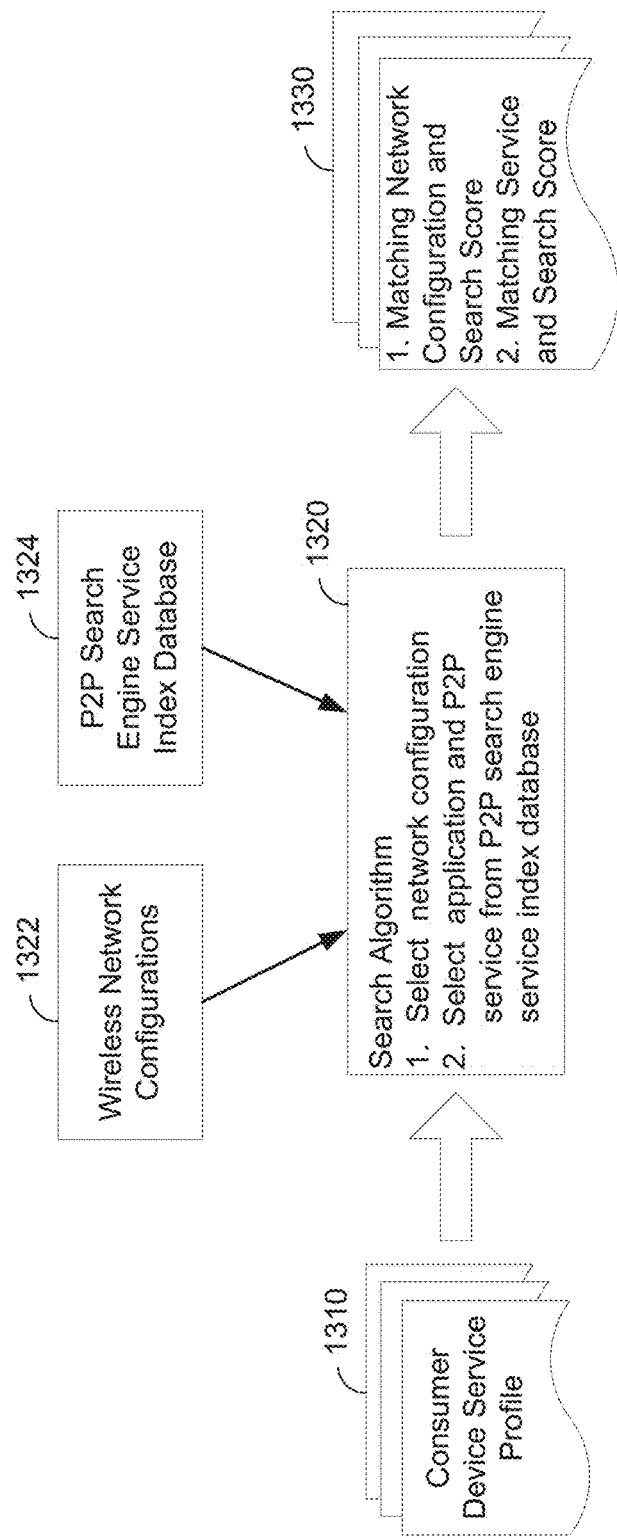
FIG. 13 illustrates an exemplary search engine according to at least one aspect of the disclosure.

FIG. 13 illustrates an exemplary search engine 1320 according to at least one aspect of the disclosure. The search engine 1320 illustrated in FIG. 13 executes on a supplier peer device, such as device B 910B in FIG. 9. The search engine 1320 receives a service profile from a consumer peer device, such as device A 910A in FIG. 9. Upon receiving the service profile, the search engine 1320 accesses the wireless network configurations 1322 and the P2P search engine service index database 1324 stored in the supplier peer device. The search engine 1320 compares the received consumer device service profile 1310 to the wireless network configurations 1322 and the P2P services listed in the P2P search engine service index database 1324. The search engine 1320 assigns scores to any matching P2P services and network configurations based on their compatibility with the criteria specified in the service profile, and outputs the matching network configurations, P2P services, and corresponding search scores as output 1330.

Figure 14:
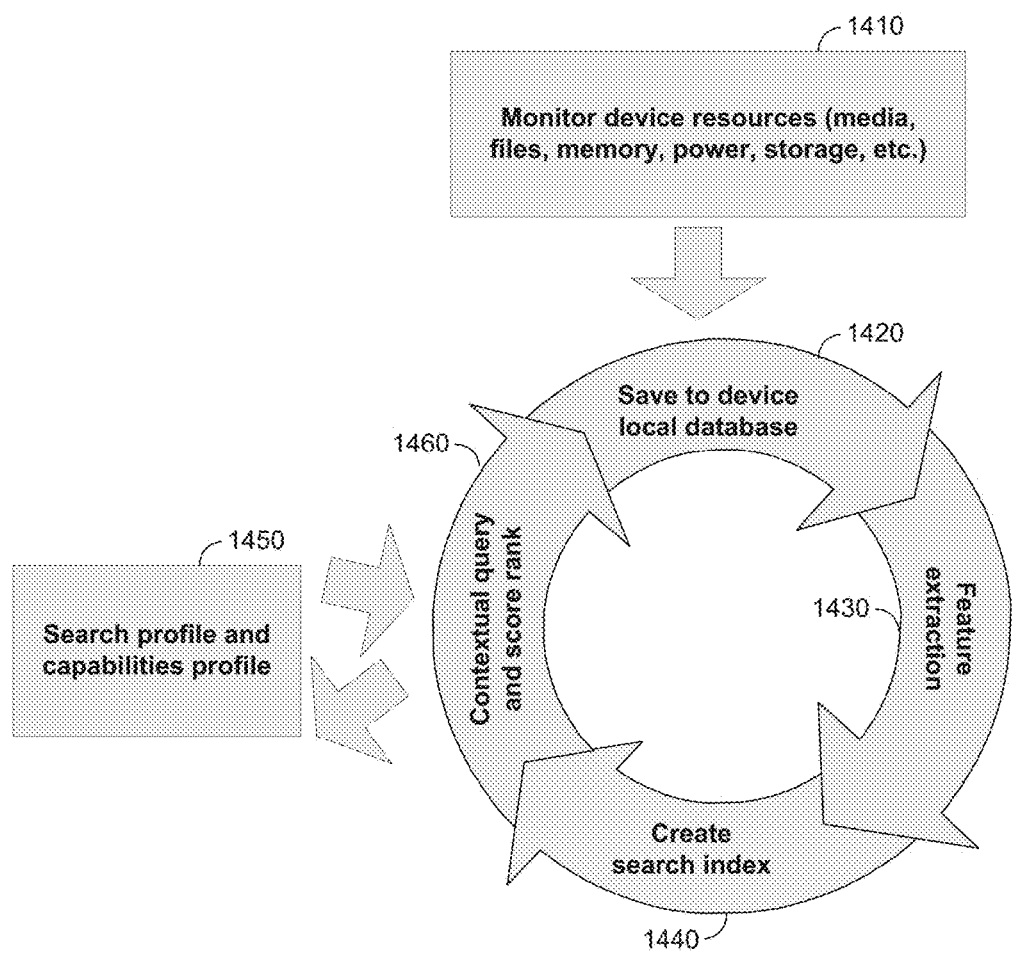
FIG. 14 illustrates an exemplary flow of a search engine according to an aspect of the disclosure.

FIG. 14 illustrates an exemplary flow of a search engine according to an aspect of the disclosure. The flow illustrated in FIG. 14 may be performed by an NFC-enabled peer device. At 1410, the device monitors its local resources, such as media files, memory, power, storage, etc. At 1420, the device saves this information in a local database. At 1430, the device performs feature extraction on the information stored in the local database. At 1440, the device creates a search index. At 1450, the device receives a search profile and capabilities profile from another NFC-enabled peer device. At 1460, the device performs a contextual query on the local database using the created search index and determines a score rank. The device responds to the received search profile and capabilities profile with the search results and determined score. The device may store the contextual query and score rank in the local database at 1420, and based on input received from monitoring the device's resources at 1410, the flow may continue to 1430.

Figure 15:
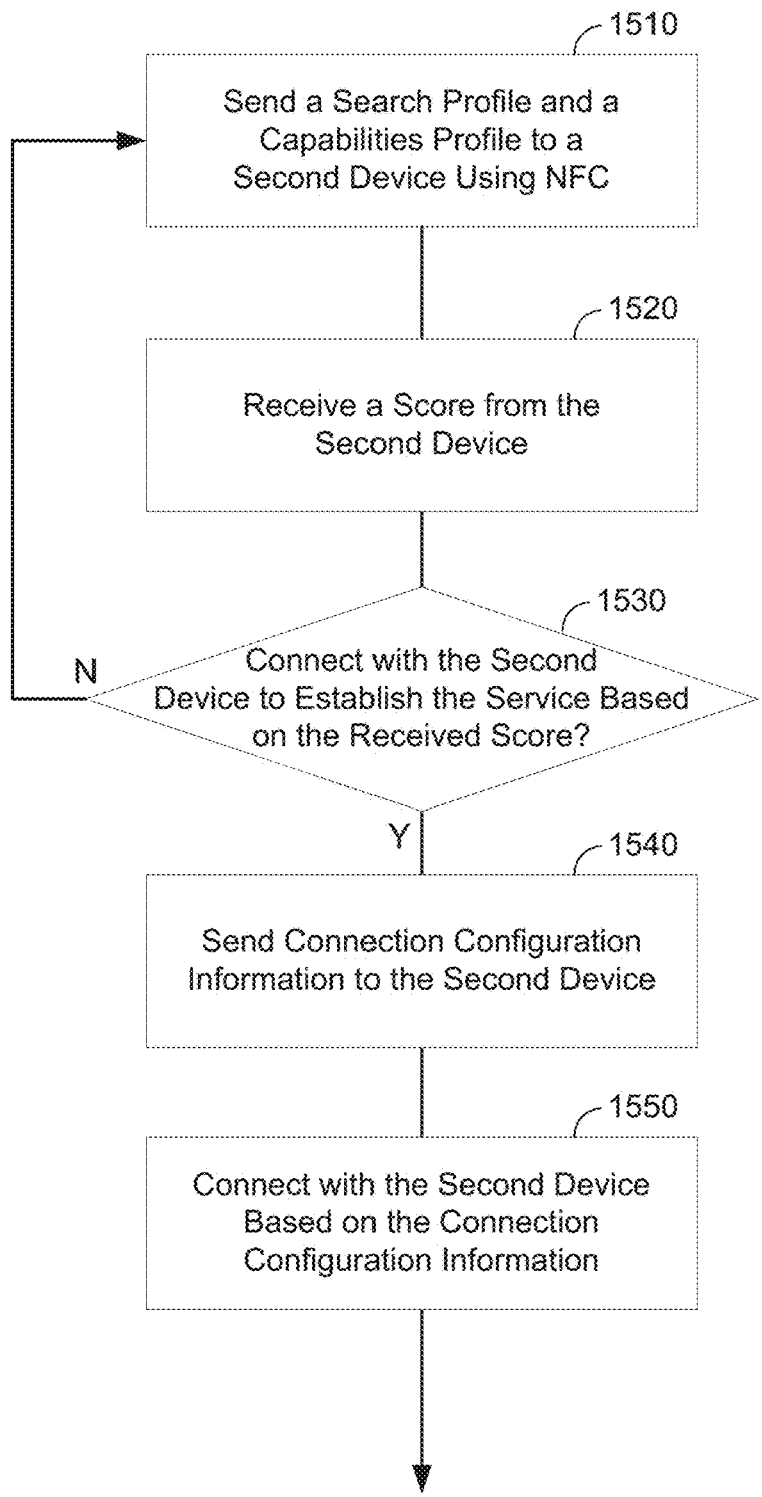
FIG. 15 illustrates an exemplary flow for searching for a second device to provide a service that a first device is attempting to establish.

FIG. 15 illustrates an exemplary flow for searching for a second device to provide a service that a first device is attempting to establish. The flow illustrated in FIG. 15 may be performed by the first device, which may be an NFC-enabled peer device, such as peer devices A 910A and B 910B in FIG. 9, device 1002 in FIG. 10, device 1102 in FIG. 11, and/or device 1202 in FIG. 12.

At 1510, the first device sends a search profile and a capabilities profile to the second device using NFC, as at 1005, 1010, and/or 1015 of FIG. 10, 1105, 1110, and/or 1115 of FIG. 11, and/or 1205, 1210, and/or 1215 of FIG. 12. The second device may be an NFC-enabled peer device, such as peer devices A 910A and B 910B in FIG. 9, devices 1004-1008 in FIG. 10, devices 1104-1108 in FIG. 11, and/or devices 1204-1208 in FIG. 12. As described above, the search profile includes criteria describing the service the first device is attempting to establish, and the capabilities profile includes connection capabilities of the first device. The service may be a proximity-based peer-to-peer service, a proximity-based peer-to-peer file sharing service, or a proximity-based peer-to-peer communication session.

At 1520, the first device receives a score from the second device, as at 1025, 1035, and/or 1045 of FIG. 10, 1125, 1135, and/or 1145 of FIG. 11, and/or 1225, 1235, and/or 1245 of FIG. 12. As discussed above, the score indicates a closeness of a match between the search profile and the capabilities profile and one or more services and capabilities of the second device.

At 1530, the first device determines whether to connect with the second device to establish the service based on the received score, as at 1050 of FIG. 10, 1150 of FIG. 11, and/or 1250 of FIG. 12. If the first device determines not to connect with the second device, the flow returns to 1510, where the first device can "touch to know" another NFC-enabled device.

Otherwise, at 1540, if the first device determines to connect with the second device, the first device sends connection configuration information to the second device, as at 1055 of FIG. 10, 1155 of FIG. 11, and/or 1255, 1260, and/or 1265 of FIG. 12. Sending the connection configuration information may be performed using NFC. The connection configuration information may include one or more of an image format, a video format, a resolution, an audio format, a bit rate, a payload size, a bandwidth, a power efficiency, or a supported network connection.

At 1550, the first device connects with the second device based on the connection configuration information, as at 1065 of FIG. 10, 1165 of FIG. 11, and/or 1270 of FIG. 12.

Figure 16:
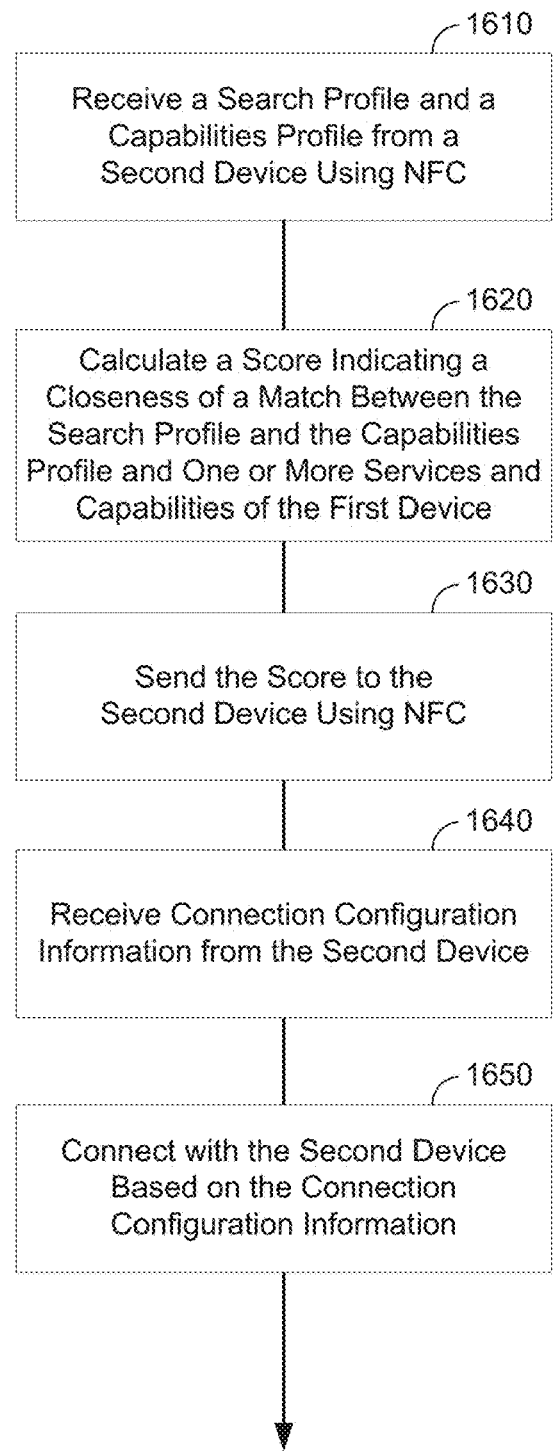
FIG. 16 illustrates an exemplary flow for providing a score for a service that a second device is attempting to establish.

FIG. 16 illustrates an exemplary flow for providing a score for a service that a second device is attempting to establish. The flow illustrated in FIG. 16 may be performed by a first device, which may be an NFC-enabled peer device, such as peer devices A 910A and B 910B in FIG. 9, any of devices 1004-1008 in FIG. 10, devices 1104-1108 in FIG. 11, and/or devices 1204-1208 in FIG. 12.

At 1610, the first device receives a search profile and a capabilities profile from the second device using NFC, as at 1005, 1010, and/or 1015 of FIG. 10, 1105, 1110, and/or 1115 of FIG. 11, and/or 1205, 1210, and/or 1215 of FIG. 12. The second device may be an NFC-enabled peer device, such as peer devices A 910A and B 910B in FIG. 9, device 1002 in FIG. 10, device 1102 in FIG. 11, and/or device 1202 in FIG. 12. As discussed above, the search profile includes criteria describing the service the first device is attempting to establish, and the capabilities profile includes connection capabilities of the first device. The service may be a proximity-based peer-to-peer service, a proximity-based peer-to-peer file sharing service, or a proximity-based peer-to-peer communication session.

At 1620, the first device calculates a score indicating a closeness of a match between the search profile and the capabilities profile and one or more services and capabilities of the second device, as at 1020, 1030, and/or 1040 of FIG. 10, 1120, 1130, and/or 1140 of FIG. 11, and/or 1220, 1230, and/or 1240 of FIG. 12.

At 1630, the first device sends the score to the second device using NFC, as at 1025, 1035, and/or 1045 of FIG. 10, 1125, 1135, and/or 1145 of FIG. 11, and/or 1225, 1235, and/or 1245 of FIG. 12.

At 1640, the first device receives connection configuration information from the second device based on the second device determining to connect with the first device, as at 1055 of FIG. 10, 1155 of FIG. 11, and/or 1255, 1260, and/or 1265 of FIG. 12. Receiving the connection configuration information may be performed using NFC. The connection configuration information may include one or more of an image format, a video format, a resolution, an audio format, a bit rate, a payload size, a bandwidth, a power efficiency, or a supported network connection.

At 1650, the first device connects with the second device based on the connection configuration information, as at 1070 of FIG. 10, 1170 of FIG. 11, and/or 1270 of FIG. 12.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of searching for a second device to provide a service that a first device is attempting to establish, comprising:
    sending a search profile and a capabilities profile from the first device to the second device using near field communication (NFC), the search profile including criteria describing the service the first device is attempting to establish, the capabilities profile including data exchange compatibility and supported network connectivity of the first device;
    receiving a score from the second device, the score indicating a closeness of a match between the search profile and the capabilities profile and one or more services and capabilities of the second device; and
    determining whether to connect with the second device to establish the service based on the received score.

2. The method of claim 1, further comprising:
    sending connection configuration information to the second device based on the first device determining to connect with the second device; and
    connecting with the second device based on the connection configuration information.

3. The method of claim 2, wherein the sending the connection configuration information is performed using NFC.

4. The method of claim 2, wherein the connection configuration information comprises one or more of an image format, a video format, a resolution, an audio format, a bit rate, a payload size, a bandwidth, a power efficiency, or a supported network connection.

5. The method of claim 1, wherein the service comprises a proximity-based peer-to-peer service.

6. The method of claim 1, wherein the service comprises a proximity-based peer-to-peer file sharing service.

7. The method of claim 1, wherein the service comprises a proximity-based peer-to-peer communication session.

8. A method of providing a score for a service that a second device is attempting to establish, comprising:
    receiving, by a first device, a search profile and a capabilities profile from the second device using near field communication (NFC), the search profile including criteria describing the service the first device is attempting to establish, the capabilities profile including data exchange compatibility and supported network connectivity of the first device;

calculating a score indicating a closeness of a match between the search profile and the capabilities profile and one or more services and capabilities of the second device; and sending the score to the second device using NFC.

9. The method of claim 8, further comprising:

receiving connection configuration information from the second device based on the second device determining to connect with the first device; and connecting with the second device based on the connection configuration information.

10. The method of claim 9, wherein the receiving the connection configuration information is performed using NFC.

11. The method of claim 9, wherein the connection configuration information comprises one or more of an image format, a video format, a resolution, an audio format, a bit rate, a payload size, a bandwidth, a power efficiency, or a supported network connection.

12. The method of claim 8, wherein the service comprises a proximity-based peer-to-peer service.

13. The method of claim 8, wherein the service comprises a proximity-based peer-to-peer file sharing service.

14. The method of claim 8, wherein the service comprises a proximity-based peer-to-peer communication session.

15. An apparatus for searching for a second device to provide a service that a first device is attempting to establish, comprising:

at least one processor of the first device configured to:

cause a transceiver of the first device to send a search profile and a capabilities profile from the first device to the second device using near field communication (NFC), the search profile including criteria describing the service the first device is attempting to establish, the capabilities profile including data exchange compatibility and supported network connectivity of the first device;

cause the transceiver to receive a score from the second device, the score indicating a closeness of a match between the search profile and the capabilities profile and one or more services and capabilities of the second device; and determine whether to connect with the second device to establish the service based on the received score.

16. The apparatus of claim 15, wherein the at least one processor is further configured to:

cause the transceiver to send connection configuration information to the second device based on a determination by the first device to connect with the second device; and cause the transceiver to connect with the second device based on the connection configuration information.

17. The apparatus of claim 16, wherein the transceiver is configured to send the connection configuration information using NFC.

18. The apparatus of claim 16, wherein the connection configuration information comprises one or more of an image format, a video format, a resolution, an audio format, a bit rate, a payload size, a bandwidth, a power efficiency, or a supported network connection.

19. The apparatus of claim 15, wherein the service comprises a proximity-based peer-to-peer service.

20. The apparatus of claim 15, wherein the service comprises a proximity-based peer-to-peer file sharing service.

21. The apparatus of claim 15, wherein the service comprises a proximity-based peer-to-peer communication session.

22. An apparatus for providing a score for a service that a second device is attempting to establish, comprising:

at least one processor of a first device configured to:

cause a transceiver of the first device to receive a search profile and a capabilities profile from the second device using near field communication (NFC), the search profile including criteria describing the service the first device is attempting to establish, the capabilities profile including data exchange compatibility and supported network connectivity of the first device;

calculate a score indicating a closeness of a match between the search profile and the capabilities profile and one or more services and capabilities of the second device; and cause the transceiver to send the score to the second device using NFC.

23. The apparatus of claim 22, wherein the at least one processor is further configured to:

cause the transceiver to receive connection configuration information from the second device based on a determination by the second device to connect with the first device; and cause the transceiver to connect with the second device based on the connection configuration information.

24. The apparatus of claim 23, wherein the transceiver is configured to receive the connection configuration information using NFC.

25. The apparatus of claim 23, wherein the connection configuration information comprises one or more of an image format, a video format, a resolution, an audio format, a bit rate, a payload size, a bandwidth, a power efficiency, or a supported network connection.

26. The apparatus of claim 22, wherein the service comprises a proximity-based peer-to-peer service.

27. The apparatus of claim 22, wherein the service comprises a proximity-based peer-to-peer file sharing service.

28. The apparatus of claim 22, wherein the service comprises a proximity-based peer-to-peer communication session.

* * * * *